(12) United States Patent
Qian et al.

(10) Patent No.: US 12,342,819 B2
(45) Date of Patent: Jul. 1, 2025

(54) ELASNIN, A BACTERIOSTATIC AGENT THAT HAS POTENT ANTIBIOFILM ACTIVITIES AGAINST BOTH MONO- AND MULTI-SPECIES BIOFILM

(71) Applicants: The Hong Kong University of Science and Technology, Hong Kong (CN); China Ocean Mineral Resources R&D Association (COMRA), Beijing (CN)

(72) Inventors: Pei-Yuan Qian, Hong Kong (CN); Lexin Long, Hong Kong (CN); Yongxin Li, Hong Kong (CN); Ruojun Wang, Hong Kong (CN); Ho Yin Chiang, Hong Kong (CN)

(73) Assignees: The Hong Kong University of Science and Technology, Hong Kong (CN); China Ocean Mineral Resources R&D Association, Beijing (CN)

( * ) Notice: Subject to any disclaimer, the term of this patent is extended or adjusted under 35 U.S.C. 154(b) by 948 days.

(21) Appl. No.: 16/999,437

(22) Filed: Aug. 21, 2020

(65) Prior Publication Data
US 2021/0051956 A1    Feb. 25, 2021

Related U.S. Application Data

(60) Provisional application No. 62/890,786, filed on Aug. 23, 2019.

(51) Int. Cl.
| | | |
|---|---|---|
| *A61K 38/14* | (2006.01) | |
| *A01N 43/16* | (2006.01) | |
| *A01N 63/28* | (2020.01) | |
| *A61K 35/74* | (2015.01) | |
| *A61P 31/04* | (2006.01) | |
| *C02F 1/50* | (2023.01) | |
| *C09D 5/14* | (2006.01) | |
| *C09D 5/16* | (2006.01) | |

(52) U.S. Cl.
CPC .......... *A01N 43/16* (2013.01); *C09D 5/1625* (2013.01)

(58) Field of Classification Search
CPC ......... A61P 31/04; A61K 38/14; A61K 35/74; A01N 43/16; A01N 63/28; C09D 5/1625; C09D 5/14; C02F 1/50
See application file for complete search history.

(56) References Cited

U.S. PATENT DOCUMENTS

2008/0095806 A1*  4/2008  Bathurst ................. A61P 27/02
                                                          514/20.3

FOREIGN PATENT DOCUMENTS

| AU | A-16578/88 | 12/1988 |
|---|---|---|
| EP | 0365539 A1 | 5/1990 |
| GB | 2533975 A | 7/2016 |
| WO | WO-2010/148079 A9 | 12/2010 |

OTHER PUBLICATIONS

Gupta et al., "Prediction of Biofilm Inhibiting Peptides: An In silico Approach," Frontiers in Microbiology, Jun. 16, 2016, 7(949); 1-11. (Year: 2016).*
Edazawa et al., "Effect of antimicrobial agent on biofilm formed by *Staphylococcus epidermidis* from blood culture: Inhibition of biofilm seeding by vancomycin," Antimicrobial resistance/ International Journal of Infectious Diseases, 2021, 10(S1): 63-64, enclosed. (Year: 2021).*
O'Toole, G. et al., "Biofilm Formation as Microbial Development", Annu. Rev. Microbiol., 2000, 54:49-79, Annual Reviews.
Flemming, H.C. et al., "The biofilm matrix", Nature Review Microbiology, Sep. 2010, 8:623-633, Macmillan Publishers Limited.
Davey, M.E. et al., "Microbial Biofilms: from Ecology to Molecular Genetics", Microbiology and Molecular Biology Reviews, Dec. 2000, 64(4):847-867, American Society for Microbiology.
Hall-Stoodley, L. et al., "Bacterial Biofilms: From the Neutral Environment to Infectious Diseases", Nature Reviews Microbiology, Feb. 2004, 2:95-108.
Rodríguez-Martínez, J.M. et al., "Antimicrobial resistance in bacterial biofilms", Reviews in Medical Microbiology, 2006, 17(3):65-75, Lippincott Williams & Wilkins.
Caetano, L. et al., "Biofilms and bacterial virulence", Reviews in Medical Microbiology, 2011, 22:12-16, Wolters Kluwer Health, Lippincott Williams & Wilkins.
Donlan, R.M., "Biofilm Formation: A Clinically Relevant Microbiological Process", Healthcare Epidemiology, Oct. 15, 2001, 33:1387-1392, Infectious Diseases Society of America.
Donlan, R.M., "Biofilms: Microbial Life on Surfaces", Emerging Infectious Diseases, Sep. 2002, 8(9):881-890.
Dang, H. et al., "Microbial Surface Colonization and Biofilm Development in Marine Environments", Microbiology and Molecular Biology Reviews, Mar. 2016, 80(1):91-138, American Society for Microbiology.
López, D. et al., "Biofilms", Cold Spring Harbor Perspective Biology, 2010, 2:a000398, pp. 1-11, Cold Spring Harbor Laboratory Press.
Hengzhuang, W. et al., "Pharmacokinetics/Pharmacodynamics of Colistin and Imipenem on Mucoid and Nonmucoid *Pseudomonas aeruginosa* Biofilms", Antimicrobial Agents and Chemotherapy, Sep. 2011, 55(9):4469-4474, American Society for Microbiology.
Davies, D., "Understanding Biofilm Resistance to Antibacterial Agents", Nature Reviews, Feb. 2003, 2:114-122.
Mah, T.C. et al., "Mechanisms of biofilm resistance to antimicrobial agents", Trends in Microbiology, Jan. 2001, 9(1):34-39, Elsevier Science Ltd.

(Continued)

*Primary Examiner* — Julie Ha
(74) *Attorney, Agent, or Firm* — Saliwanchik, Lloyd & Eisenschenk

(57) ABSTRACT

Compositions and methods of eradicating biofilms and/or inhibiting the formation of a biofilms or fouling by non-biofilm forming organisms using elasnin-based compositions are described. The elasnin can be combined with antimicrobial compounds and/or traditional coating ingredients.

13 Claims, 20 Drawing Sheets
Specification includes a Sequence Listing.

(56) References Cited

OTHER PUBLICATIONS

Hall, C.W. et al., "Molecular mechanisms of biofilm-based antibiotic resistance and tolerance in pathogenic bacteria", FEMS Microbiology Reviews, 2017, 41(3):276-301, FEMS.
Pozo, J.D. et al., "The Challenge of Treating Biofilm-associated Bacterial Infections", Clinical Pharmacology & Therapeutics, Aug. 2007, 82(2):204-209.
De Carvalho, C.C.C.R., "Marine Biofilms: A Successful Microbial Strategy With Economic Implications", Review, Apr. 2018, vol. 5, Article 126, pp. 1-11.
Lehaitre, M. et al., "Biofouling and Underwater Measurements", 2008, 24 pages, Oceanographic Methodology Series, UNESCO, Paris.
Koo, H. et al., "Targeting microbial biofilms: current and prospective therapeutic strategies", Nat Rev Microbiol., Dec. 2017, 15(12):740-755.
Ribeiro, S.M. et al., "New frontiers for anti-biofilm drug development", Pharmacology & Therapeutics, 2016, 160:133-144, Elsevier Inc.
Li, J.W.H. et al., "Drug Discovery and Natural Products: End of an Era or an Endless Frontier", Science, Jul. 10, 2009, 325:161-165.
Fischbach, M.A. et al., "Antibiotics for Emerging Pathogens", Science, Aug. 28, 2009, 325:1089-1093.
Nosengo, N., "New tricks for old drugs", Nature, Jun. 16, 2016, 354:314-316, Macmillan Publishers Limited.
Genilloud, O., "Actinomycetes: still a source of novel antibiotics", Natural Product Reports, 2017, 34:1203-1232, The Royal Society of Chemistry.
Kaleem, F. et al., "Sensitivity pattern of methicillin resistant *Staphylococcus aureus* isolated from patients admitted in a tertiary care hospital of Pakistan", Iranian Journal of Microbiology, Sep. 2010, 2(3):143-146.

Garau, J. et al., "Management of methicillin-resistant *Staphylococcus aureus* infections", Clinical Microbiology and Infection, Feb. 2009, 15(2):125-136, European Society of Clinical Microbiology and Infectious Disease.
Laplante, K.L. et al., "In Vitro Activities of Telavancin and Vancomycin against Biofilm-Producing *Staphylococcus aureus*, *S. epidermidis*, and *Enterococcus* faecalis Strains", Antimicrobial Agents and Chemotherapy, Jul. 2009, 53(7):3166-3169, American Society for Microbiology.
Rodrigues, A. et al., "Dexamethasone abrogates the antimicrobial and antibiofilm activities of different drugs against clinical isolates of *Staphylococcus aureus* and *Pseudomonas aeruginosa*", Journal of Advanced Research, 2017, 8:55-61, Elsevier B.V.
Flemming, H.C. et al., "Biofilms: an emergent form of bacterial life", Nature Reviews Microbiology, Sep. 2016, 14:563-575, Macmillan Publishers Limited.
Lebeaux, D. et al., "Biofilm-Related Infections: Bridging the Gap between Clinical Management and Fundamental Aspects of Recalcitrance toward Antibiotics", Microbiology and Molecular Biology Reviews, Sep. 2014, 78(3):510-543, American Society for Microbiology.
Yin, Q. et al., "Butenolide, a Marine-Derived Broad-Spectrum Antibiofilm Agent Against Both Gram-Positive and Gram-Negative Pathogenic Bacteria", Marine Biotechnology, 2019, 21:88-98, Springer.
Nair, S. et al., "Antibiofilm Activity and Synergistic Inhibition of *Staphylococcus aureus* Biofilms by Bactericidal Protein P128 in Combination with Antibiotics", Antimicrobial Agents and Chemotherapy, Dec. 2016, 60(12):7280-7289, American Society for Microbiology.
Bolyen, E. et al., Reproducible, interactive, scalable and extensible microbiome data science using QIIME 2, Nature Biotechnology, Aug. 2019, 37:848-857.
Patel, R.K. et al., "NGS QC Toolkit: A Toolkit for Quality Control of Next Generation Sequencing Data", PLOS One, Feb. 2012, vol. 7, No. 2, e30619, pp. 1-7.
Stowe, S.D. et al., "Anti-Biofilm Compounds Derived from Marine Sponges", Marine Drugs, 2011, 9:2010-2035.

\* cited by examiner

FIG. 2D

| Bioactivities (µg/mL) | Van | Elasnin |
|---|---|---|
| MIC | 0.625-1.25 | 1.25-2.5 |
| MBC | 10-50 | >100 |
| $MBIC_{90}$ | 1.25-2.5 | 1.25-2.5 |
| $MBEC_{50}$ | 10-20 | 0.625-1.25 |

| (µg/mL) | MRSA ATCC 43300 | S. aureus B04 | S. aureus ATCC 25923 | B. subtilis 168 | E. coli ATCC 25922 | P. aeruginosa PAO1 |
|---|---|---|---|---|---|---|
| MBIC(90%) | 1.25-2.5 | 1.25-2.5 | 1.25-2.5 | 2.5-5 | >100 | >100 |
| MBEC(50%) | 0.625-1.25 | 2.5-5 | 0.625-1.25 | 1.25-2.5 | >100 | >100 |

FIG. 5D

| Coating | Control | 1.5 % | 2.5 % | 5 % | 10 % |
|---|---|---|---|---|---|
| Crude extract wt% | 0 | 1.5 % | 2.5 % | 5 % | 10 % |
| Elasnin wt% | 0 | 0.60% | 1.01% | 2.03% | 4.05% |

H-H COSY

| Concentration(µg/ml) | MIC | MBIC | MBEC |
|---|---|---|---|
| >100 | 1-15; 18-20 | 1-15; 18-20 | 1-15; 18-20 |
| 20-100 | 17 | - | - |
| 4-20 | - | 17 | 17 |
| <4 | 16 | 16 | 16 |

SEQUENCE LISTING

<160> NUMBER OF SEQ ID NOS: 2

<210> SEQ ID NO 1
<211> LENGTH: 17
<212> TYPE: DNA
<213> ORGANISM: Streptomyces sulphureus

<400> SEQUENCE: 1
cctaygggrb gcascag                                                   17

<210> SEQ ID NO 2
<211> LENGTH: 20
<212> TYPE: DNA
<213> ORGANISM: Streptomyces sulphureus
<220> FEATURE:
<221> NAME/KEY: misc_feature
<222> LOCATION: (8)..(9)
<223> OTHER INFORMATION: n is a, c, g, or t

<400> SEQUENCE: 2
ggactacnng ggtatctaat                                                20

ELASNIN, A BACTERIOSTATIC AGENT THAT HAS POTENT ANTIBIOFILM ACTIVITIES AGAINST BOTH MONO- AND MULTI-SPECIES BIOFILM

CROSS-REFERENCE TO RELATED APPLICATION

This application claims the benefit of U.S. Provisional Application Ser. No. 62/890,786, filed Aug. 23, 2019, which is hereby incorporated by reference in its entirety including any tables, figures, or drawings.

BACKGROUND OF THE INVENTION

A biofilm is an organized aggregate of microorganisms that is attached to a surface (1). It consists of cells and a matrix of extracellular polymeric substances (EPS), which contain a variety of biopolymers such as proteins, nucleic acids, lipids, and other substances that maintain connections between cells and allowing for cell-to-cell interactions (2). Microorganisms within the biofilm can be a single microbial species or multiple populations. The microorganisms can colonize a variety of biotic and abiotic surfaces, constructing a structurally and dynamically complex, multifunctional biological system that enables them to survive in a diverse environment and resist external threats (3,4). Despite the variety of different habitats, bacteria form biofilms in similar ways. The process starts with the adhesion of planktonic cells to a surface in response to environmental signals, followed by EPS secretion and multiplication of the small aggregates of cells called microcolonies. With time, the microcolonies mix and develop into a mature biofilm with a three-dimension structure. Cells can detach from the mature biofilm and disperse to colonize other niches, starting a new cycle (4-8).

The formation of a biofilm is a key factor in bacteria's survival; its elaborate architecture provides a shield to the cells within it and offers the cells the spatial proximity and internal homeostasis to facilitate growth and differentiation, contributing to the persistence of the cells in various environments (3, 4, 9). Biofilms can concentrate nutrients and an incorporated water channel and pore structures enable effective nutrient uptake, enhances metabolite transport, and promotes cell-to-cell interactions. Consequently, distinct environmental signals, enriched by the metabolic cooperation, result in the changes of gene expression that creates diverse and specialized subpopulations in specific microenvironments (3,9). When residing in the biofilms, organisms are persistent in the environment and are more resistant to antimicrobial treatments, poisons, protozoan, and host immune systems than planktonic microorganisms (6,10). Biofilms are 10 to 1,000-fold less susceptible to various antimicrobial agents. Once a biofilm develops, it is hard to eradicate and completely remove (11,12). Several mechanisms have been proposed to explain biofilm resistance (4,5,13,14). The first mechanism is the barrier function of EPS. Cells within the biofilm are embedded by various EPS, which stop or dilute the diffusion of components into the cells. Altered growth rate is also considered to be a protective mechanism of biofilm organisms. The starvation of the bacteria slows down bacterial growth and can cause a transition from exponential growth to a slow growth or no growth phase. Additionally, the close interactions within the biofilm facilitate gene transfer and differentiation, which may give rise to resistant phenotypes, affecting the efficacy of antimicrobial agents. Other resistance mechanisms, such as antimicrobial efflux pumps and antibiotic-modifying enzymes, have also been proposed. Consequently, standard antibiotic therapies can only eliminate planktonic cells, and sessile cells within the biofilm can be restored quickly and continue to propagate and disseminate.

More than 65% of nosocomial infections are related to biofilm formation and the mortality rate of these infections is up to 70%, in which both device-related infections and chronic non device-related infections are included, adding more than $1 billion in extra costs annually for treatment (3,13,15). Chronic lung infections caused by *Pseudomonas aeruginosa* in cystic fibrosis (CF) patients and the infections caused by *Staphylococcus* spp. on indwelling medical devices are two important examples in biofilm-involved infections (14). Patients with cystic fibrosis (CF) are easily infected by *P. aeruginosa*, and the EPS produced by biofilm cells can cause a hyperactive inflammatory response in the lungs and destroy lung function, which can lead to death (3). *Staphylococcus* spp. (particularly *S. aureus* and *S. epidermidis*) are the most common microorganisms in human biofilm-related infections. These bacteria are often found on human skin and can colonize medical indwelling devices, assisting the spread to the other sites, which can serve as a source of systematic infections (6). *Staphylococcus* spp. are extremely resistant to antibiotic therapy and the immune system. This is not only because of the abundant antimicrobial-resistant phenotype but also the bacteria's ability to use inflammatory response products to induce biofilm formation. Consequently, advanced devices like intravenous catheters, prosthetic heart valves, and endotracheal tubes can introduce fatal infections to humans (4-6). Additionally, the formation of biofilms has created significant problems in various industrial activities such as aquaculture, heat exchangers, the oil and gas industry, maritime transport, and water desalination. Biofilms induce the settlement of large macrofouling organisms and accelerate biocorrosion, leading to a 35-50% increase in fuel consumption, 5-20% increase in operational costs for cleaning, and 20-30% increase in corrosion-related costs (16,17). Considering the increasing seriousness of biofilm-associated problems, only a limited number of methods are available for biofilm control. The methods include physical removal, sustained antimicrobial treatments, and surface-coatings (18). Some non-toxic "green" coatings were developed from silicone, fluorine, and fluorine-silicon to combat biofilms with antimicrobial agents in both industrial and clinical settings. Yet, in most cases, the existing processes are expensive and most antibiotics were developed to target planktonic cells, so treating biofilms requires high doses and increases the selectivity of antibiotic resistant phenotypes (16,18,19). Therefore, efficient, safe, environmentally-friendly, and cost-effective anti-biofilm agents need to be developed.

BRIEF SUMMARY OF THE INVENTION

The subject invention provides anti-biofilm compositions. Specifically, the subject invention provides methods for inhibiting biofilm formation, disrupting mature biofilms, and inhibiting biofouling organisms' attachment. The invention also pertains to anti-biofilm compositions comprising elasnin and/or antimicrobial compounds. In certain embodiments, the elasnin can be produced by *Streptomyces mobaraensis* DSM 40847.

In certain embodiments, anti-biofilm compositions are provided, comprising elasnin and one or more antimicrobial compounds. In certain embodiments, the antimicrobial ingredients include, for example, vancomycin.

In certain embodiments, anti-biofilm compositions are provided, comprising elasnin, and one or more traditional surface coating ingredients. In certain embodiments, the surface coating ingredients include, for example, binders, solvents, pigments, pH modifiers, buffering agent or any other ingredient that composes, for example, paints, primers, lacquers, or sealants.

In certain embodiments, the present invention utilizes bacteria strains and/or byproducts of their growth. The invention provides, for example, a microbe-based product comprising cultivated *Streptomyces mobaraensis* DSM 40847 and/or products of the growth of that microbe.

In preferred embodiments, methods for inhibiting biofilm formation and/or eradicating existing biofilms are provided, the methods comprising applying elasnin to a surface and/or a biofilm. In certain embodiments, the addition of the elasnin-based composition to the surface enhances the performance and/or longevity of the surface.

Advantageously, the subject invention provides environmentally-friendly anti-biofilm compositions and methods for use. Elasnin can remain closely associated to where it is applied, so significant quantities are not leached into the surrounding environment, including marine and freshwater environments. The ability of elasnin to remain where applied can preserve the existence of non-fouling biofilms.

BRIEF DESCRIPTION OF THE DRAWINGS

FIG. 2D is a summary of MICs, MBCs, MBICs, and MBECs. Points below 0% are not shown in the figure.

FIG. 5D shows compositions of the elasnin coatings used to determine anti-biofilm properties of elasnin.

(FIG. 7B) heteronuclear single quantum coherence ($^1$H-$^{13}$C HMQC); (FIG. 7C) heteronuclear multiple bond correlation ($^1$H-$^{13}$C HMBC), and (FIG. 7D) correlation spectrometry ($^1$H-$^1$H COSY) spectra.

BRIEF DESCRIPTION OF THE SEQUENCES

Figure 1A:
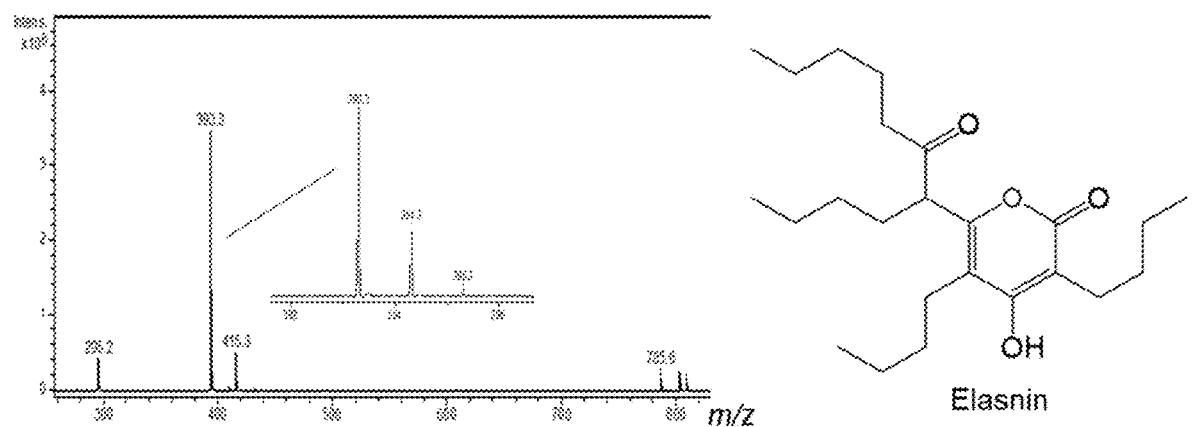
FIG. 1A shows the Mass Spectra (ESI) and structure and elasnin.
Figure 1B:
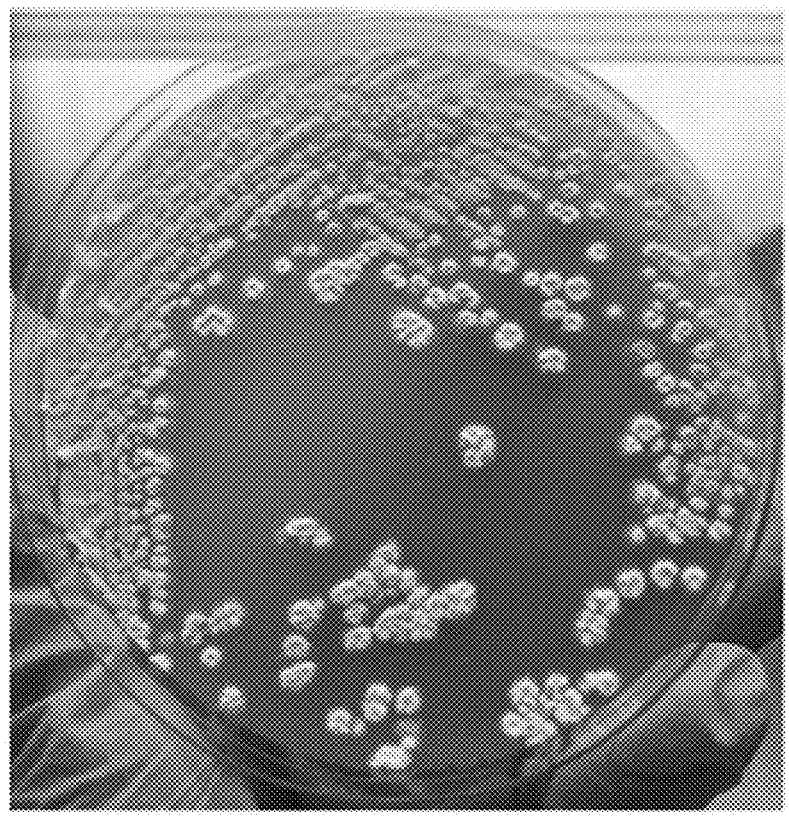
FIG. 1B shows the growth of *Streptomyces mobaraensis* DSM 40847 on GYM agar plates. GYM agar is composed of glucose (4.0 g), yeast extract (4.0 g), malt extract (10.0 g), $CaCO_3$ (2.0 g), agar (12.0 g), and distilled water (1000.0 ml) (Adjust pH to 7.2 before adding agar).

SEQ ID NOs: 1 to 2 provide primer sequences to amplify the hypervariable V3-V4 region of 16S rRNA in bacteria.

DETAILED DISCLOSURE OF THE INVENTION

The subject invention provides compositions and method for inhibiting biofilm formation and/or eradicating biofilms. Specifically, the subject invention provides compositions and methods for the use of elasnin to inhibit and/or eradicate biofilms. In certain embodiments, the anti-biofilm composition can comprise antimicrobial compounds and/or traditional coating ingredients.

Selected Definitions

As used herein, the singular forms "a," "an," and "the" are intended to include the plural forms as well, unless the context clearly indicates otherwise. Further, to the extent that the terms "including," "includes," "having," "has," "with," or variants thereof are used in either the detailed description and/or the claims, such terms are intended to be inclusive in a manner similar to the term "comprising." The transitional terms/phrases (and any grammatical variations thereof) "comprising," "comprises," "comprise," include the phrases "consisting essentially of," "consists essentially of," "consisting," and "consists."

The phrases "consisting essentially of" or "consists essentially of" indicate that the claim encompasses embodiments containing the specified materials or steps and those that do not materially affect the basic and novel characteristic(s) of the claim.

The term "about" means within an acceptable error range for the particular value as determined by one of ordinary skill in the art, which will depend in part on how the value is measured or determined, i.e., the limitations of the measurement system. Where particular values are described in the application and claims, unless otherwise stated the term "about" meaning within an acceptable error range for the particular value should be assumed.

In the present disclosure, ranges are stated in shorthand, to avoid having to set out at length and describe each and every value within the range. Any appropriate value within the range can be selected, where appropriate, as the upper value, lower value, or the terminus of the range. For example, a range of 1-10 represents the terminal values of 1 and 10, as well as the intermediate values of 2, 3, 4, 5, 6, 7, 8, 9, and all intermediate ranges encompassed within 1-10, such as 2-5, 2-8, and 7-10. Also, when ranges are used herein, combinations and sub-combinations of ranges (e.g., subranges within the disclosed range) and specific embodiments therein are intended to be explicitly included.

As used herein, a "biofilm" is a complex aggregate of microorganisms, such as bacteria, wherein the cells adhere to each other and/or to a surface using an extracellular polysaccharide matrix. The cells in biofilms are physiologically distinct from planktonic cells of the same organism, which are single cells that can float or swim in liquid medium.

As used herein, "harvested" refers to removing some or all of a microbe-based composition from a growth vessel.

According to the subject invention, a harmful accumulation of material, including living organisms or non-living substances results in the process of "fouling." "Fouling" can result in clogging, scaling, or other undesired buildup. "Fouling" can affect the efficiency, reliability, or functionality of the object.

Elasnin Compositions

The disclosure provides approaches for inhibiting and/or eradicating biofilms using compositions comprising elasnin.

In preferred embodiments, the compositions and methods according to the subject invention utilize elasnin and/or bacterial culture extracts. The elasnin may be in a purified form or in a mixture of bacterial growth products, including crude extracts. The elasnin may be added at concentrations of 0.01 to 90% by weight (wt %), preferably 0.1 to 50 wt %, and more preferably 0.1 to 20 wt %. In another embodiment, purified elasnin may be in combination with an acceptable carrier, in that elasnin may be presented at concentrations of 0.001 to 50% (v/v), preferably, 0.01 to 20% (v/v), more preferably, 0.02 to 10% (v/v).

The microorganisms utilized according to the subject invention may be natural, or genetically modified microorganisms. For example, the microorganisms may be transformed with specific genes to exhibit specific characteristics. The microorganisms may also be mutants of a desired strain. As used herein, "mutant" means a strain, genetic variant or subtype of a reference microorganism, wherein the mutant has one or more genetic variations (e.g., a point mutation, missense mutation, nonsense mutation, deletion, duplication, frameshift mutation or repeat expansion) as compared to the reference microorganism. Procedures for making mutants are well known in the microbiological art. For example, UV mutagenesis and nitrosoguanidine are used extensively toward this end.

In certain embodiments, the microorganisms are any bacteria that produce elasnin. The elasnin and/or associated bacteria culture extracts can be produced by bacteria, including *Streptomyces* spp. In preferred embodiments, the elasnin is produced by *Streptomyces mobaraensis* DSM 40847.

In one embodiment, the method for cultivation of microorganisms is carried out at about 5° C. to about 100° C., preferably, 15 to 60° C., more preferably, 25° C. to 50° C. In a further embodiment, the cultivation may be carried out continuously at a constant temperature. In another embodiment, the cultivation may be subject to changing temperatures.

In one embodiment, the equipment used in the method and cultivation process is sterile. The cultivation equipment such as the reactor/vessel may be separated from, but connected to, a sterilizing unit, e.g., an autoclave. The cultivation equipment may also have a sterilizing unit that sterilizes in situ before starting the inoculation. Air can be sterilized by methods know in the art. For example, the ambient air can pass through at least one filter before being introduced into the vessel. In other embodiments, the medium may be pasteurized or, optionally, no heat at all added, where the use of low water activity and low pH may be exploited to control bacterial growth.

The biomass content of the bacteria growth broth may be, for example from 5 g/l to 180 g/l or more. In one embodiment, the solids content of the broth is from 10 g/l to 150 g/l.

In one embodiment, the anti-biofilm compositions comprise a bacterial culture produced according to the subject methods.

The microbial growth byproduct produced by microorganisms of interest may be retained in the microorganisms or secreted into the liquid medium. In another embodiment, the method for producing microbial growth byproduct may further comprise steps of concentrating and purifying the microbial growth byproduct of interest. In a further embodiment, the liquid medium may contain compounds that stabilize the activity of microbial growth byproduct.

Preparation of Anti-Biofilm Products

One elasnin-based product of the subject invention is simply the bacterial growth broth containing the bacteria and/or the elasnin produced by the bacteria and/or any residual nutrients. The product of bacteria growth may be used directly without extraction or purification. If desired, extraction and purification can be easily achieved using standard extraction and/or purification methods or techniques.

In preferred embodiments, elasnin can be extracted from bacteria by n-hexane to obtain crude extracts. The crude extracts can be further processed to form a coating. The crude extracts coating (CR coating) can be prepared by mixing solutions of crude extracts and polyesters. Typically, the crude extracts can added at a wt % of about 1% to about 50%, about 5% to about 25% or about 10 wt % and a polyester, such as a Poly($\varepsilon$-caprolactone) diol, including PCL-PU80, can be added at a wt % of about 50% to about 99%, about 5% to about 75%, or about 90 wt %, and the combination can be dissolved by vigorous stirring in xylene and THF (v:v=1:2) at about 25° C. After enough mixing, the solution can coat a surface. The surface can be dried at about 5° C. to about 50° C., about 10° C. to about 37° C., or about 15° C. to about 25° C. for at least 1 hour, 2 hours, 4 hours, 8 hours, 24 hours, 72 hours, 1 week, 2 weeks, of a greater time period to remove the solvent. The same procedure can be followed to prepare coatings with different concentrations of crude extracts and/or polyesters.

Upon harvesting the anti-biofilm composition from the growth vessels, further components can be added as the harvested product is placed into containers and/or piped (or otherwise transported for use). The additives can be, for example, dyes, pigments, pH adjusting agents, buffers, salts, adhesion-promoting compounds, solvents (e.g., isopropyl alcohol, ethanol), biocides, other microbes, and other ingredients specific for an intended use.

In certain embodiments, the anti-biofilm composition can be added to existing compositions that are traditionally used to coat surfaces. Additionally, the anti-biofilm composition can be applied to a surface before, concurrently with, or after the application of a composition that is traditionally used to coat surfaces.

In certain embodiments, the anti-biofilm composition of the subject invention comprises a binder, primarily responsible for adhesion of the anti-biofilm composition to an object and/or surface. The binder compounds can be selected from, for example, acrylic, alkyds, acrylic acid, acrylamide, phenolic, phenolic-alkyd, polyacrylamide, polyurethanes, silicone-alkyd, polyesters, epoxies, vinyl, vinyl acetate-ethylene, vinyl-alkyd, inorganic binders (sodium, potassium ethyl silicate, lithium, etc.), organic binders (carbon-based), Tectyl® (Daubert Chemical Company, Inc., Chicago, IL), aliphatic-urethanes, and oil-modified urethanes.

In certain embodiments, the anti-biofilm composition of the subject invention comprises a pigment or dye, which can provide the color to the primer. Pigments or dyes can be natural, synthetic, inorganic, or organic. The pigments or dyes can be selected from, for example, titanium dioxide, zinc oxide, zinc yellow, yellow dyes, benzidine yellows, chrome oxide green, phthalocyanine green, phthalocyanine blue, ultramarine blue, vermillion, pigment brown 6, red 170, dioxazine violet, carbon black, iron (II) oxide, quartz sand ($SiO_2$), talc, barite ($BaSO_4$), kaolin clay, and limestone ($CaCO_3$).

In certain embodiments, one of the solvents used in the composition is selected from mineral or organic solvents, including, for example, ethanol, butanol, propanol, aliphatic hydrocarbons, alicyclic hydrocarbons, xylene, toluene, ketones, and/or isopropyl alcohol.

In certain embodiments, the composition further comprises water as solvent. The water can be filtered by granular-activated carbon, deionized, distilled, or processed by reverse osmosis. Additionally, pH modifiers can be used to increase or decrease the pH to, preferably, facilitate the dissolution of various components of the anti-biofilm compositions. The water-based anti-biofilm compositions can be acrylic-based or latex-based. The latex can be from a natural origin, such as, for example, a flowering plant (angiosperm), or, preferably, the latex is synthetically derived from, for example, polymerizing styrene. The acrylic base for an anti-biofilm composition can be created from acrylic resins, which are synthetic thermoplastics.

In certain embodiments, the anti-biofilm composition can be oil-based. Synthetic or natural resins can be used in combination with any one of the aforementioned solvents to create the oil-based resin. Alkyd resins can be, for example, used in the subject composition. Alkyd resins can be created using natural oils, such as, for example, linseed oil, safflower oil, soybean oil, sunflower oil, tung oil, or castor oil.

In one embodiment, the elasnin-based product may further comprise buffering agents including organic and amino acids or their salts. Suitable buffers include, for example, citrate, gluconate, tartrate, malate, acetate, lactate, oxalate, aspartate, malonate, glucoheptonate, pyruvate, galactarate, glucarate, tartronate, glutamate, glycine, lysine, glutamine, methionine, cysteine, arginine and a mixture thereof. Phosphoric and phosphorous acids or their salts may also be used. Synthetic buffers are suitable to be used, but it is preferable to use natural buffers such as organic and amino acids or their salts listed above.

In a further embodiment, pH modifying agents can be added to the compositions, which include potassium hydroxide, ammonium hydroxide, potassium carbonate or bicarbonate, hydrochloric acid, nitric acid, sulfuric acid or a mixture.

The anti-biofilm product may be applied with a composition that promotes adherence of the anti-biofilm product to a surface to be treated. The adhesion-promoting substance may be a component of the anti-biofilm product or it may be applied simultaneously or sequentially with the anti-biofilm product. Examples of useful adhesion promoters include maleic acid, crotonic acid, fumaric acid, polyesters, polyamides, polyethers, polyacrylates and polyurethanes.

Other additives that can used in anti-biofilm compositions include water softening agents, sequestrants, corrosion inhibitors, and antioxidants, which are added in amounts effective to perform their intended function. Identification and use of these additives, and amounts thereof, is well within the skill of the art. Suitable water softening agents include linear phosphates, styrene-maleic acid co-polymers, and polyacrylates. Suitable sequestrants include 1,3-dimethyl-2-immidazolidinone; 1-phenyl-3-isoheptyl-1,3-propanedione; and 2 hydroxy-5-nonylacetophenoneoxime.

Examples of corrosion inhibitors include 2-aminomethyl propanol, diethylethanolamine benzotriazole, and methyl benzotriazole. Antioxidants suitable for the present invention include (BHT) 2,6-di-tert-butyl-para-cresol, (BHA) 2,6-di-tert-butyl-para-anisole, Eastman inhibitor O A B M-oxalyl bis (benzylidenehydrazide), and Eastman DTBMA 2,5-di-tert-butylhydroquinone.

Other suitable additives, which may be contained in the formulations according to the invention, include substances that are customarily used for such preparations. The additives can be, for example, carriers, other microbe-based compositions produced at the same or different facility, viscosity modifiers, preservatives, tracking agents, biocides, driers, flow control agents, defoamers, UV stabilizers, anti-skinning agents, texturizers, emulsifying agents, lubricants, solubility controlling agents, chelating agents, and/or stabilizers.

Advantageously, in accordance with the subject invention, the anti-biofilm product may comprise broth in which the microbes were grown. The product may be, for example, at least, by weight, 0.01%, 0.1%, 1%, 5%, 10%, 25%, 50%, 75%, or 100% broth. The amount of biomass in the product, by weight, may be, for example, anywhere from 0% to 100% inclusive of all percentages therebetween.

Optionally, the product can be stored prior to use. The storage time is preferably short. Thus, the storage time may be less than 60 days, 45 days, 30 days, 20 days, 15 days, 10 days, 7 days, 5 days, 3 days, 2 days, 1 day, or 12 hours. In a preferred embodiment, if live cells are present in the product, the product is stored at a cool temperature such as, for example, less than 20° C., 15° C., 10° C., or 5° C.

In certain embodiments, the anti-biofilm composition of the subject invention can comprise antimicrobial agents. The antimicrobial agents can be bactericidal or bacteriostatic. AN exemplary antimicrobial agent is vancomycin; however, other envisioned antimicrobial agents include beta-lactam antibiotics, daptomycin, fluoroquinolones (e.g., ciprofloxacin), metronidazole, nitrofurantoin, co-trimoxazole, telithromycin, and aminoglycosidic antibiotics.

Use of Elasnin in Anti-Biofilm Compositions

In preferred embodiments, methods are provided for applying an anti-biofilm composition directly onto an existing biofilm or onto a surface that can be fouled by a biofilm, wherein elasnin and/or a bacterial culture comprising an elasnin is applied to a biofilm or onto a surface. The use of anti-biofilm compositions according to the subject invention can provide a variety of improvements upon application to a biofilm, surface, and/or object. The described elements of the subject invention are not an exhaustive examination of all applications.

In certain embodiments, the anti-biofilm composition can disrupt the structure of the biofilm, including the EPS. The anti-biofilm composition can inhibit biofilm-forming organisms from establishing a biofilm structure, primarily the EPS, water channels, and pore structures.

The anti-biofilm compositions of the subject invention can be applied to a variety of inorganic or organic object surfaces such as, for example, metals including steel, aluminum, iron; organic matter including wood, coral, paper, cotton, silk, hair, skin, fur, rubber or plants; plastics; minerals including gypsum; glass; concrete; plaster; clay; or stucco. The surfaces can be used in a variety of industries including medical device, aquaculture, fishing, water desalination, water purification, nuclear power plants, and marine and freshwater navigation. The surfaces can be tubing, pipes, needles, pumps, propellers, hulls, decks, railings, buoys, barges, docks, and chains, ropes. The compositions can be applied to objects that reside in a range of temperatures, aquatic environments, or other stress-inducing conditions. The anti-biofilm compositions can be added to a traditional coating product such as, for example, paints, primers, lacquers, stains, and sealants. Additionally, the anti-biofilm compositions can be applied to an object preceding, concurrently, or after a traditional coating product is applied.

The composition can be applied to the surface or biofilm by spraying using, for example, a spray bottle or a pressurized spraying device. The composition can also be applied using a cloth or a brush, wherein the composition is rubbed, spread or brushed onto the surface or biofilm. Furthermore, the composition can be applied to the surface or biofilm by dipping, dunking, or submerging the surface into a container having the composition therein.

In certain embodiments, the elasnin-based composition can inhibit biofilm formation and/or eradicate mature or immature biofilms of bacteria with nonlethal effect on cells. The elasnin-based composition can be combined with antimicrobial agents if bacteriostatic or bactericidal activity is required. Preferably, the biofilms are composed of Gram-positive bacteria, but other bacteria, including Gram-negative bacteria, are also envisioned.

The anti-biofilm compositions can be added to existing antimicrobial products. Additionally, the anti-biofilm compositions can be applied to an object preceding, concurrently, or after an antimicrobial product is applied.

In certain embodiments, the elasnin can inhibit or eradicate non-biofilm forming organisms. These organisms can include macroscopic organisms that settle on or near biofilms, including marine organisms such as, for example, shellfish and algae.

In preferred embodiments, methods for inhibiting biofilm formation and/or eradicating existing biofilms are provided, the methods comprising applying elasnin to a surface. In certain embodiments, the addition of the elasnin-based composition to the surface enhances the performance and/or longevity of the surface. The performance may be enhanced by reducing friction, such as on the hull of a boat or the wing of a plane. The longevity can be enhanced by reducing the frequency of cleaning fouled surfaces and/or reducing biocorrosion attributed to biotic sources. In certain embodiments, the elasnin-comprising anti-biofilm composition increases the longevity of a surface and/or object to which it is applied by inhibiting fouling of the surface and/or object by living organisms or non-living substances. The subject invention can be used to inhibit deposition of organisms or precipitates. Thus, the present invention allows for delaying or completely removing the necessity for preventative maintenance related to removing precipitates and deposits, as well as the need for replacing or repairing equipment parts.

MATERIALS AND METHODS

Strains, Culture Media, and Antibiotics

12 Actinobacteria strains were purchased from the German Collection of Microorganisms and Cell Cultures (DSMZ, Braunschweig, Germany). Testing strains MRSA ATCC 43300, *E. coli* ATCC 25922, and *S. aureus* ATCC 25923 were purchased form American Type Culture Collection; marine *S. aureus* B04 is the laboratory's stock isolated from marine biofilm and *B. subtilis* 168 was obtained from the stock of the lab. Soybean powder was purchased from Wugumf, China; soluble starch were purchased from Affymetrix, USA; magnesium sulfate hydrate was purchased from Riedel-De Haen, Germany; bacteriological peptone was obtained from Oxoid, Italy; Mueller Hinton Broth (MHB) was purchased from Fluka AG, Switzerland; phosphate-buffered saline (PBS) was purchased from Thermo Fisher Scientific Inc, USA; LB, Glucose, MTT, Vancomycin, chloramphenicol, and 1-Butanol were purchased from VWR, UK; and all other chemicals were supplied by Sigma Chemical Ltd., USA.

Secondary Metabolites Screening and Compound Isolation

A stock culture of 12 strains of Actinobacteria were inoculated into 50 ml AM4, AM5 and AM6 medium with glass beads inside (to break globular colonies) and incubated at 22° C. and 30° C. on a rotary shaker (170 rpm). AM4 media is comprised of soybean powder (20 g/L), peptone bacteriological (2 g/L), glucose (20 g/L), soluble starch (5 g/L), yeast extract (2 g/L), NaCl (4 g/L), $K_2HPO_4$ (0.5 g/L), $MgSO_4 \cdot 7 H_2O$ (0.5 g/L), and $CaCO_3$ (2 g/L) at pH 7.8. AM5 media is comprised of malt extract (10 g/L), yeast extract (4 g/L), and glucose (4 g/L). AM6 media is comprised of soluble starch (20 g/L), glucose (10 g/L), peptone bacteriological (5 g/L), yeast extract (5 g/L), and $CaCO_3$ (5 g/L) at pH 7.2-7.5. Culture broth was extracted with 1-butanol at 3, 5 and 7 days; the crude extracts were dissolved with DMSO for storage and bioassays. Pure compounds were isolated by reverse-phase high performance liquid chromatography (HPLC, Waters 2695, Milford, MA, USA) using a semi-prep C18 column (10×250 mm) that was eluted with a 55-min gradient of 5-95% aqueous acetonitrile (ACN) containing 0.05% tetrahydrofuran (TFA) at a flow rate of 3 ml/min.

Antimicrobial Susceptibility Testing

Minimum inhibitory concentrations (MICs) and minimum bactericidal concentrations (MBCs) were determined with MRSA ATCC 43300 and *E. coli* ATCC 25922, according to the Clinical and Laboratory Standards Institute guideline CLSI M100 (2018). Approximately $10^5$ CFU/ml overnight culture of the bacteria strains were inoculated into MHB and treated with series concentrations of Elasnin (or crude extracts and antibiotics). After 24 hours incubation, the minimum concentration at which shows no visible bacteria growth was recorded as MIC. MBCs were measured following the MIC assay by plating 1 ml suitable diluted culture broth from each well on Mueller Hinton Agar (MHA) plate. The MBCs were defined as lowest concentration at which antimicrobial agent caused >99.9% reduction of cells. Each assay was done in duplicates and repeated 3 times.

Anti-Biofilm Assays

Minimum biofilm inhibitory concentrations (MBICs) and minimum biofilm eradication concentrations (MBECs) were determined as previously described (30, 31).

MBIC Assay

An overnight culture of the testing strains was diluted into approximately $10^7$ with LB and 0.5% glucose and treated with various concentrations of Elasnin in 96-well cell culture plates. Culture broth was then incubated at 37° C. for 24 hours and rinsed twice by 1×PBS to remove non-adhering and planktonic cells. After the wash, MTT staining assay was conducted to measure viable cells in the biofilm since the MTT can react with activated succinate dehydrogenase in viable cell mitochondria to form blue violet formazan, which can be read at 570 nm after being dissolved in DMSO.

MBEC Assay

The ability of Elasnin to eradicate pre-formed mature biofilm was tested through a MBEC assay. Similar to MBIC assay, an overnight culture of testing strains was incubated for 24 hours in 96-well cell culture plates but without adding Elasnin to form biofilm. Formed biofilm was then rinsed twice by 1×PBS and challenged with a series concentration of Elasnin (diluted with LB and 0.5% glucose) and incubated for another 24 hours at 37° C. After incubation, each well was rinsed twice by 1×PBS and MTT assay was conducted to measure viable cells in remaining biofilm.

Concentration Response Curve Studies

MRSA ATCC 43300 was used for concentration response curve study. $4 \times 10^5$ CFU/ml of exponentially growing MRSA was inoculated into MHB with various concentrations of elasnin and vancomycin in 15 ml falcon tubes. The tubes were incubated at 37° C. on a rotary shaker for 24 hours; 1 ml of culture broth in each tube was diluted with MHB and 1 ml diluted bacteria was plated on MHA plates for the CFU counting. Each concentration was plated on two plates and the experiments were repeated 3-times.

Productivity Monitoring and Extraction Efficiency Comparison

A stock culture of *S. mobaraensis* DSM 40847 was incubated in AM4 medium as described in *Secondary metabolites screening and compound isolation*. 1 ml of culture broth was removed every 12 hours and the Elasnin was extracted using 1 ml of 1-butanol, ethyl acetate (EA) and hexane separately. The solvents were then removed by evaporation. The crude extract was dissolved in methanol and quantified through HPLC analysis with an analysis phenomenex luna C18 column. The experiment was conducted in triplicate. The peak of Elasnin was identified through retention time and its concentration was calculated based on an established standard curve. The structure of elasnin was elucidated through nuclear magnetic resonance (NMR) analysis of 1H, 1H-1H-COSY, 1H-13C-HSQC, and 1H-13C-HMBC NMR spectra recorded on a Bruker AV500 spectrometer (500 MHz) using dimethyl sulfoxide-$d_6$ ($^1$H-NMR DMSO-$d_6$: $\delta H=2.50$ ppm; DMSO-$d_6$: $\delta C=39.50$ ppm).

Coating Preparation

4 L culture broth of *S. mobaraensis* DSM 40847 (incubated as described *Secondary metabolites screening and compound isolation*) were extracted by n-hexane to obtain high Elasnin content crude extracts. The crude extracts coating (CR coating) was prepared by mixing solutions. Typically, for the 10 wt % CR coating, PCL-PU80 (0.90 g, 90 wt %) and crude extracts (0.10 g, 10 wt %) were dissolved by vigorous stirring in xylene and THF (v:v=1:2) at 25° C. After enough mixing, the solution was coated on a glass slide and dried at room temperature for a week to remove the solvent. The same procedure was followed to prepare coatings with different concentrations of crude extracts.

Marine Natural Biofilm Assay and Release Rate Determination

Glass slides with CR coating, as described previously, were exposed at Yung Shue O Fish Farm, Hong Kong for 2, 3, and 4 weeks, in April 2019, to subtidal water (22°20'16.7"N, 114°16'08.0"E). The glass slides were transported back to the laboratory in a cooler with in situ seawater and were washed twice using autoclaved and 0.22 μm-filtered seawater to remove loose particles and cells; afterwards the slides were stained by Filmtracer™ LIVE/DEAD™ Biofilm Viability Kit and sent for confocal laser scanning microscopy (CLSM) observation. At the same time, the release rate of Elasnin was determined by measuring its concentration using high performance liquid chromatography (HPLC) under a static condition. The panel coated with crude extracts and polymer was immersed in a measuring container with 100 ml of sterilized artificial seawater. 10 ml seawater was taken after 24 hours of immersion and extracted with same volume of dichloromethane, which was then removed under nitrogen gas. After drying, the extract was resuspended in 100 ml of methanol and subject to HPLC analysis as described above. The release rate was measured every week for 4 weeks and each concentration was done in duplicates.

CLSM Observation with Biofilm Cell and Matrix Staining

Biofilms were grown on glass cover slides as described for the MBIC and MBEC assays. Treated biofilms were then rinsed twice with 1×PBS and stained with FilmTracer™ FM® 1-43 green biofilm cell stain and FilmTracer™ SYPRO® Ruby Biofilm Matrix Stain at room temperature for 30 min in the dark. Leica Sp8 Confocal Microscope was employed to observe cells and matrix in the biofilm at 488 nm.

DNA Extraction, 16S rRNA Gene Sequencing, and Analyses

Biofilm samples on the coated slide surface were collected with autoclaved cotton and stored in DNA storage buffer (10 mM Tris-HCl; 0.5 mM EDTA, pH 8.0) at −80° C. Before the extraction, samples were vortexed several times to release the microbial cells into the DNA storage buffer. All the samples were then subjected to centrifugation at 10,000 rpm for 1 min, and the supernatant was discarded. After continuous treatment with 10 mg/mL lysozyme and 20 mg/mL proteinase K, DNA was extracted from the treated microbial cells with a microbial genomic DNA extraction kit (Tiangen Biotech, Beijing, China) following the manufacturer's protocol.

The quality of DNA samples was controlled using Nano-Drop (which tests the DNA purity, OD260/OD280) and agarose gel electrophoresis (which tests for DNA degradation and potential contamination). The hypervariable V3-V4 region (forward primer: 5'-CCTAYGGGRBGCASCAG-3' (SEQ ID NO: 1); reverse primer: 5'-GGAC-TACNNGGGTATCTAAT-3' (SEQ ID NO: 2)) of prokaryotic 16S rRNA genes was used to amplify DNA from biofilms by polymerase chain reaction (PCR). PCR products were purified before library construction and sequenced at Novogene (Beijing, China) on the NovaSeq 6000 System. The read length was 250 bp, and each pair of reads had a 50-bp overlapping region. The paired-end reads were subjected to quality control using the NGS QC Toolkit (version 2.0). The 16S rRNA gene amplicon data were analyzed using the software package QIIME2 then merged using Q2_manifest_maker.py in QIIME2. The low-quality reads and chimeras were removed using dada2 commands in QIIME2. To normalize the uneven sequencing depth, 500, 000 filtered reads for each sample were picked up. Operational taxonomic units (OTUs) were classified de novo from the pooled reads at 97% sequence similarity using a classifier trained by the Naive Bayes method. Representative sequences were then recovered using the feature-classifier classify-sklearn script in QIIME2. The alpha-diversity analyses (observed OTUs and Shannon diversity) were performed using the script 'qiime diversity alpha' in QIIME2. Beta-diversity based on the Bray-Curtis distances was conducted by the cluster analysis in the software PAST (version 3.0). Additionally, the taxonomic structure was drawn in Excel (Office 365 MSO 64-bit) based on the relative abundance.

Statistical Analyses

Statistical analyses for all data were performed using the GraphPad Prism 8.0.2 software. Biofilm compositions on CR coated glass slides were compared to control groups using unpaired t tests.

All patents, patent applications, provisional applications, and publications referred to or cited herein are incorporated by reference in their entirety, including all figures and tables, to the extent they are not inconsistent with the explicit teachings of this specification.

Following are examples that illustrate procedures for practicing the invention. These examples should not be construed as limiting. All percentages are by weight and all solvent mixture proportions are by volume unless otherwise noted.

EXAMPLE 1—METABOLITES PRODUCED BY ACTINOBACTERIA

The inevitable rise in microbial resistance to antibiotics poses a grave threat to modern medicine, imposing enormous pressure to discover new drugs. However, drug discovery has been trapped by the skyrocketing costs. The worldwide antibiotic market is still dominated by antibiotics that were discovered decades ago (20, 21). Researchers have started to look at ways to repurpose old drugs (22). In our bioassay-guided drug discovery, four isolated antimicrobial compounds were identified from various Actinomycetes bacteria and among them elasnin was the only compound that presented activity against attached cells. Elasnin was first discovered by Satoshi Ōmura as a new human granulocyte elastase inhibitor, produced by strain *Streptomyces noboritoensis* KM 2753. It inhibits human granulocyte elastase but shows almost no activities against pancreatic elastase, chymotrypsin, and trypsin. The low toxicity and specific activities make it an ideal candidate in treating acute arthritis, various inflammations, pulmonary emphysema, and pancreatitis (23). However, there are no known uses for elasnin as an anti-biofilm agent.

Figure 1C:
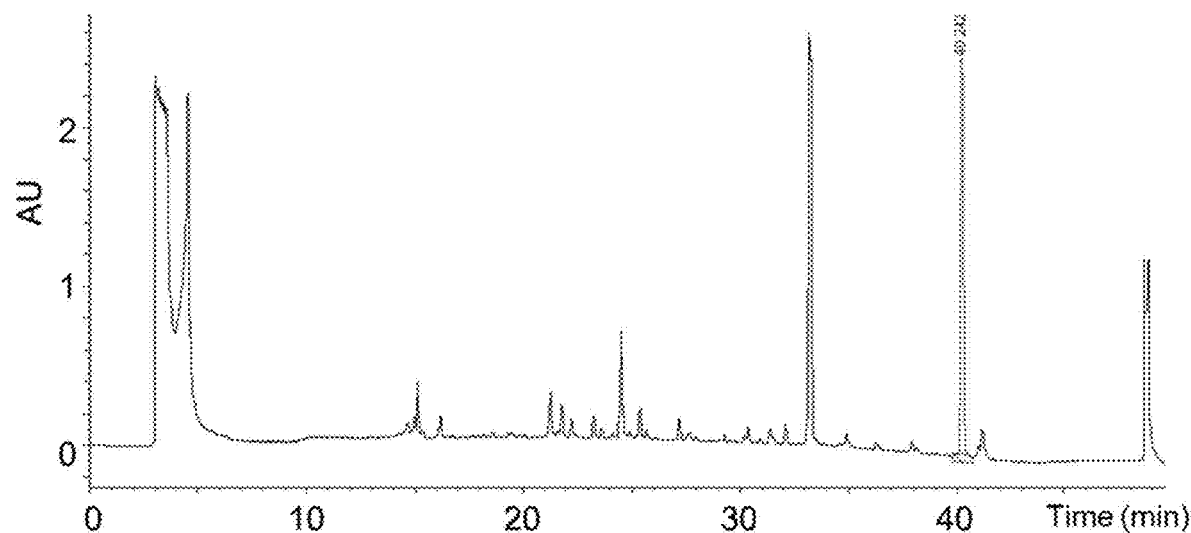
FIG. 1C shows the HPLC analysis of the crude extracts of *S. mobaraensis* DSM 40847.
Figure 1D:
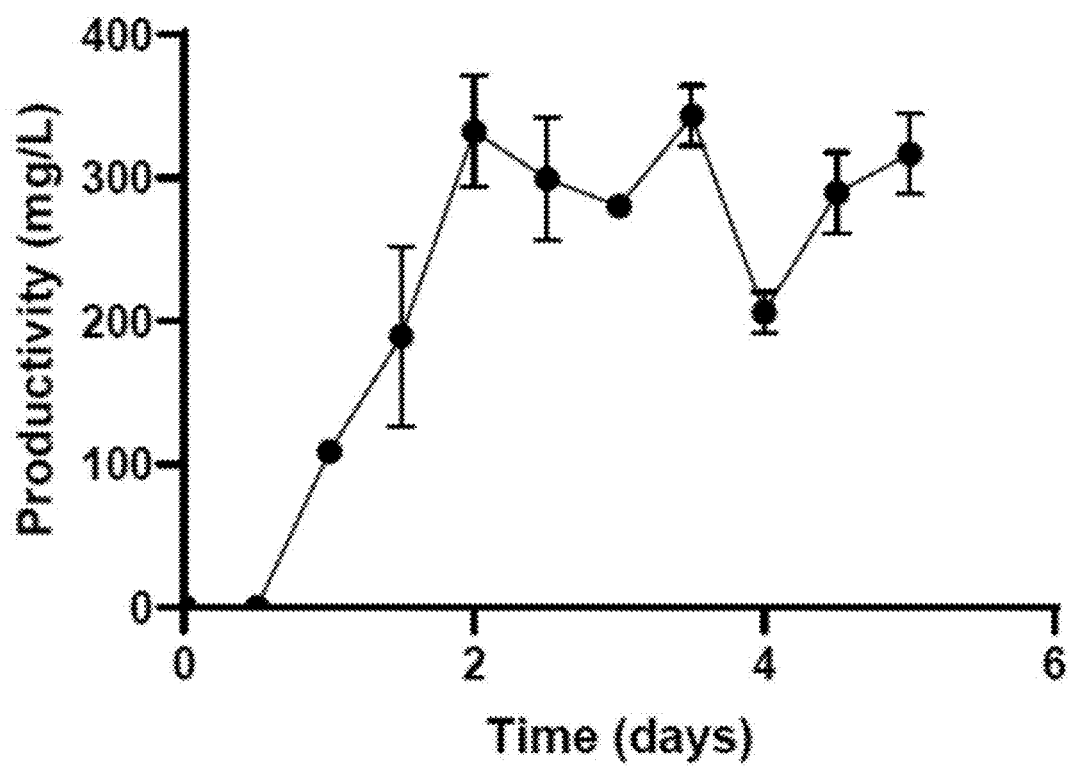
FIG. 1D shows a time course of the production of elasnin in AM4 medium under 30° C.

Secondary metabolites produced by 12 Actinobacteria strains under different culture conditions were assessed for bioactivities against Gram-positive bacteria MRSA and Gram-negative *E. coli* (Table 1). Four main compounds were discovered to have antimicrobial activities against MRSA. Among the strains, only the compound produced by strain *S. mobaraensis* DSM40847 has anti-biofilm activities. Compounds were subsequently purified by high performance liquid chromatography (HPLC) and characterized structurally by ultra-performance liquid chromatography-tandem mass spectrometer (UPLC-MS/MS) and nuclear magnetic resonance (NMR) analysis (FIG. 1C and FIG. 1A). Molecular weight of 392.3 illustrated by UPLC-MS/MS and the structure elucidation completed through NMR analysis identified the bioactive fraction (FIG. 1A) isolated from the crude extracts of *S. mobaraensis* is a known compound, elasnin (FIG. 7). Elasnin's production by strain DSM40847 was then explored (FIG. 1D). As shown in FIG. 1D, the productivity of elasnin increased rapidly after 12 hours of inoculation and peaked on the second day with a yield of 332 mg/L. The productivity of elasnin remained constant with slightly changes in demonstrated range (289±83 mg/L).

Table 1. shows the bioassay results of the crude extracts from 12 Actinobacteria strains against Methicillin-resistant *Staphylococcus aureus* and *Escherichia coli*.

| | Bioassa | | | |
| --- | --- | --- | --- | --- |
| Strain | MIC (µg/mL) | MBIC (µg/mL) | MBEC (µg/mL) | Identification |
| *Streptomyces mobaraensis* DSM 40847 | <4 | <4 | <4 | Elasnin |
| *Nocardiopsis potens* DSM 45234 | <4 | >100 | >100 | Xanthone |

-continued

| Strain | Bioassa | | | |
|---|---|---|---|---|
| | MIC (µg/mL) | MBIC (µg/mL) | MBEC (µg/mL) | Identification |
| Streptomyces scabrisporus DSM 41855 | <4 | >100 | >100 | Hitachimycin |
| Streptomyces sulphureus DSM 40104 | 20-100 | >100 | >100 | Resistomycin |
| Kutzneria albida DSM 43870 | 20-100 | >100 | >100 | — |
| Streptomyces fulvissimus DSM 40593 | >100 | >100 | >100 | — |
| Streptomyces exfoliates DSM 41693 | >100 | >100 | >100 | — |
| Saccharothrix espanaensis DSM 44229 | >100 | >100 | >100 | — |
| Nocardiopsis synnemataformans DSM 44143 | >100 | >100 | >100 | — |
| Sciscionella marina DSM 45152 | >100 | >100 | >100 | — |
| Nonomuraea coxensis DSM 45129 | >100 | >100 | >100 | — |
| Streptomyces cattleya DSM 46488 | >100 | >100 | >100 | — |

EXAMPLE 2—ELASNIN ACTIVITY

Due to the existence of EPS and variety tolerance mechanisms, biofilms are often resistant to traditional antibiotic treatment. In conventional therapy, vancomycin has always been the choice in treating most MRSA infections (24,25). To determine elasnin's activities against biofilm and planktonic cells, minimum inhibitory concentrations (MICs), minimum bactericidal concentrations (MBCs), minimum biofilm inhibitory concentrations (MBICs), and minimum biofilm eradication concentrations (MBECs) were conducted with MRSA in comparison to vancomycin.

Elasnin's effect on planktonic cells was determined based on the results of MIC, MBC, and concentration-response assays. According to the results, planktonic cells were susceptible to both elasnin and vancomycin with same MICs of 0.5-2 µg/ml. MBCs were measured and the results illustrated that elasnin exhibited bacteriostatic activities with an MBC above 100 µg/ml, while vancomycin showed strong bactericidal activities with a MBC between 20-50 µg/ml (FIG. 2D). The effect on planktonic cells by the agents was further revealed by concentration-response curve in FIG. 2C. Within the range of 0 to 50 µg/ml, vancomycin's activity was concentration dependent, which caused the sharp decrease in cell density as the concentration increased. In contrast, cell densities did not significantly differ with the change in compound concentrations of elasnin within the range of 0 to 100 µg/ml.

Figure 2A:
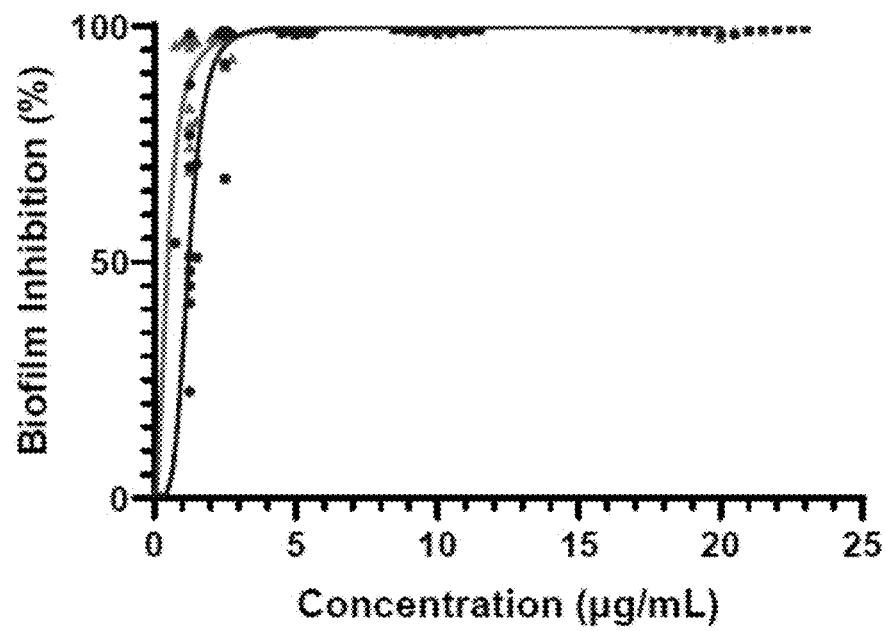
FIG. 2A shows the minimum concentration needed for inhibiting 90% biofilm formation.
Figure 2B:
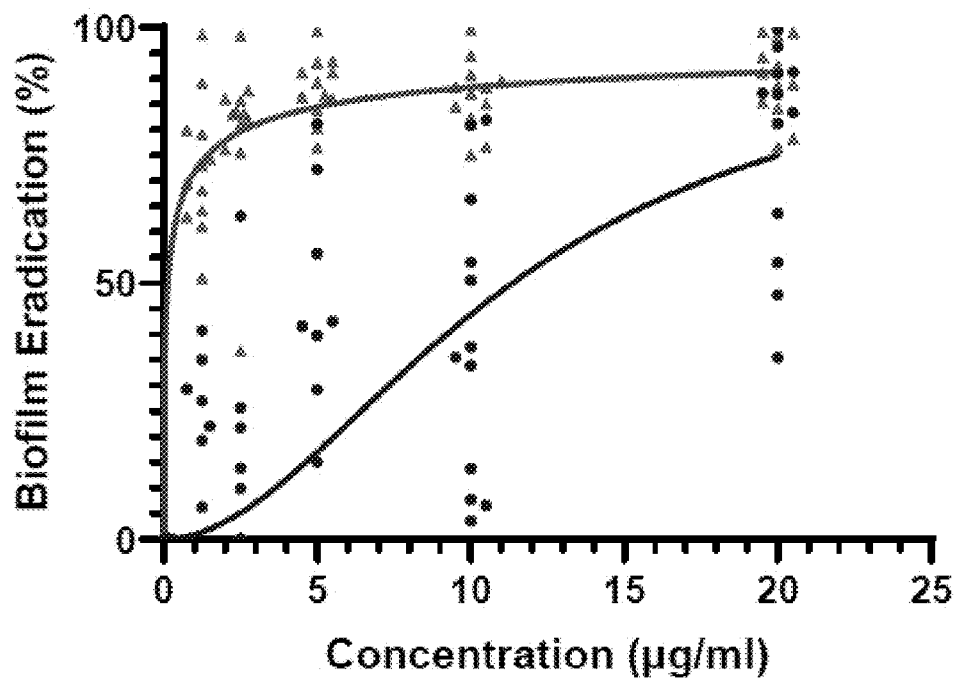
FIG. 2B shows the minimum concentration needed for eradicating 50% mature biofilms.
Figure 2C:
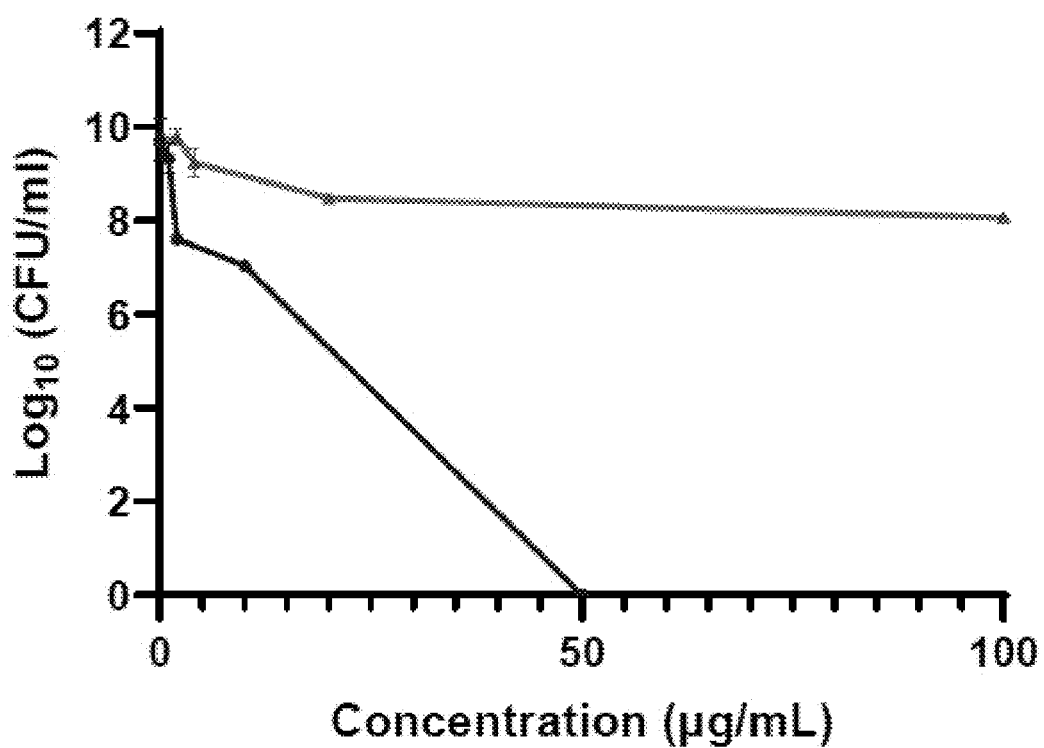
FIG. 2C shows the cell viability after 24 hours of treatment using various antimicrobials.

MBICs and MBECs were tested to explore elasnin's influence on biofilm cells. The rise of resistance was seen in attached cells, and elasnin presented the best activity against the attached cells. Both elasnin and vancomycin can inhibit biofilm formation with a MBIC of 1.25-2.5 µg/ml (FIG. 2A). Significant differences among the two agents were observed in MBEC assays. Cells in the developed, mature biofilms were resistant to antibiotics. More than 10 µg/ml of vancomycin were needed to cause a 50% reduction in the cell density. Interestingly, elasnin's activity was not affected by biofilm resistance, with a concentration of 1.25 µg/ml used to eradicate the mature biofilm by 50% within 24 hours (FIG. 2B).

Consistent with the previous studies (26,27), bacterial resistance developed to vancomycin in pre-formed mature biofilms, while no increase in resistance was observed in elasnin-treated attached cells.

EXAMPLE 3—ELASNIN EFFECT ON BIOFILM STRUCTURE

Figure 3A:
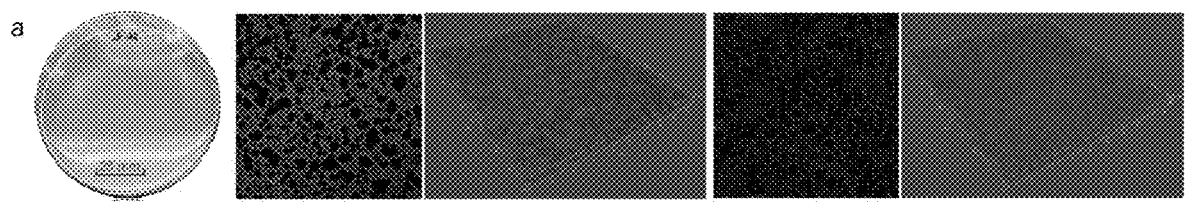
FIG. 3A shows the MRSA biofilms after incubation for 24 hr (control). Series 1 are pictures of biofilms under direct observation. Series 2 and 3 were two- and three-dimensional confocal images of biofilm cells stained by FilmTracer™ FM® 1-43 green biofilm cell stain. Series 4 and 5 were 2D and 3D images of biofilm matrix stained by FilmTracer™ SYPRO® Ruby Biofilm Matrix Stain. Confocal images were acquired under the same conditions, and quantitative analysis was conducted using Leica Application Suite X based on the relative fluorescence of 3D confocal images.
Figure 3B:
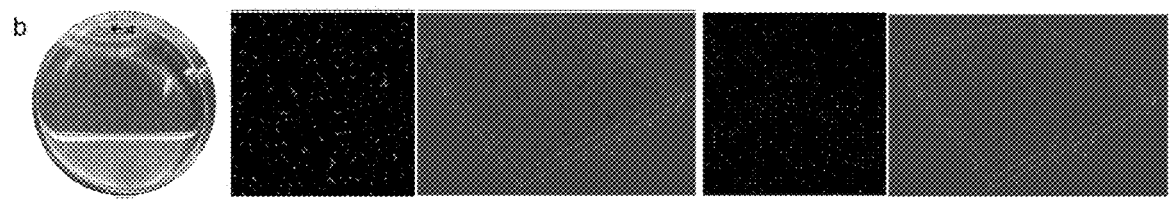
FIG. 3B shows the MRSA biofilms after incubation for 24 hr with elasnin treatment at a concentration of 4 μg/mL (treatment). Series 1 are pictures of biofilms under direct observation. Series 2 and 3 were two- and three-dimensional confocal images of biofilm cells stained by FilmTracer™ FM® 1-43 green biofilm cell stain. Series 4 and 5 were 2D and 3D images of biofilm matrix stained by FilmTracer™ SYPRO® Ruby Biofilm Matrix Stain. Confocal images were acquired under the same conditions, and quantitative analysis was conducted using Leica Application Suite X based on the relative fluorescence of 3D confocal images.
Figure 3C:
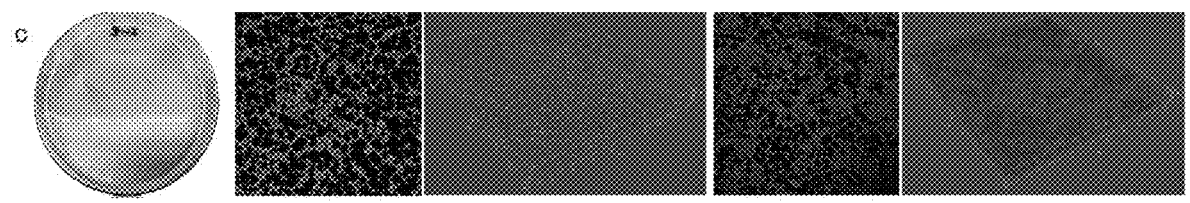
FIG. 3C shows the pre-formed MRSA biofilms after another incubation for 18 hr (control). Series 1 are pictures of biofilms under direct observation. Series 2 and 3 were two- and three-dimensional confocal images of biofilm cells stained by FilmTracer™ FM® 1-43 green biofilm cell stain. Series 4 and 5 were 2D and 3D images of biofilm matrix stained by FilmTracer™ SYPRO® Ruby Biofilm Matrix Stain. Confocal images were acquired under the same conditions, and quantitative analysis was conducted using Leica Application Suite X based on the relative fluorescence of 3D confocal images.
Figure 3D:
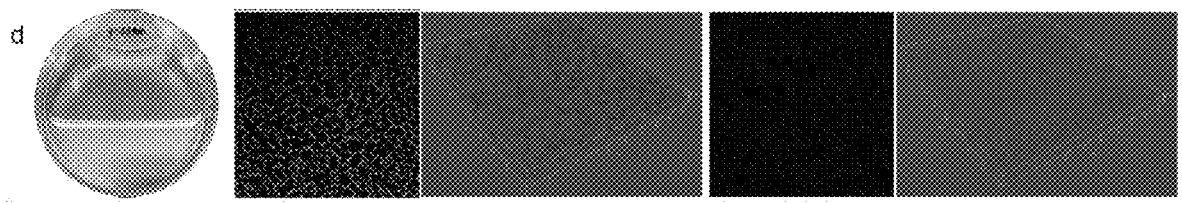
FIG. 3D shows the pre-formed MRSA biofilms after another incubation for 18 hr with elasnin treatment at a concentration of 4 μg/mL (treatment). Series 1 are pictures of biofilms under direct observation. Series 2 and 3 were two- and three-dimensional confocal images of biofilm cells stained by FilmTracer™ FM® 1-43 green biofilm cell stain. Series 4 and 5 were 2D and 3D images of biofilm matrix stained by FilmTracer™ SYPRO® Ruby Biofilm Matrix Stain. Confocal images were acquired under the same conditions, and quantitative analysis was conducted using Leica Application Suite X based on the relative fluorescence of 3D confocal images.
Figure 3E:
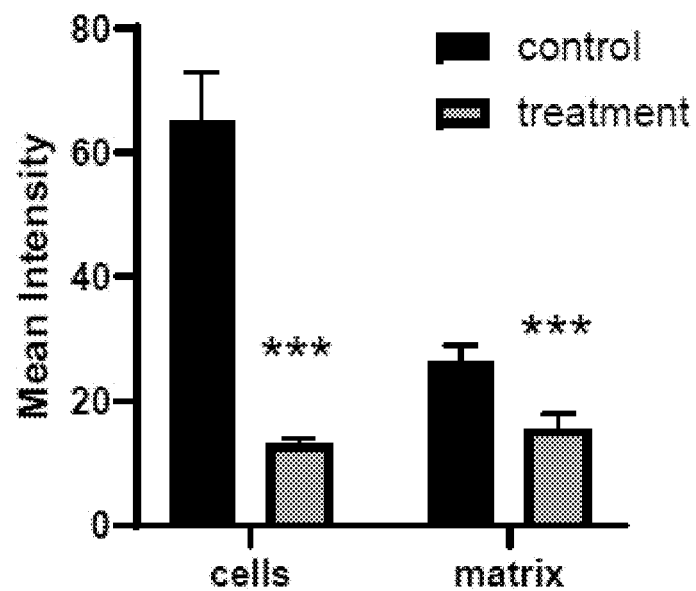
FIG. 3E demonstrates the quantitative analysis of confocal images acquired in a biofilm inhibition assay.
Figure 3F:
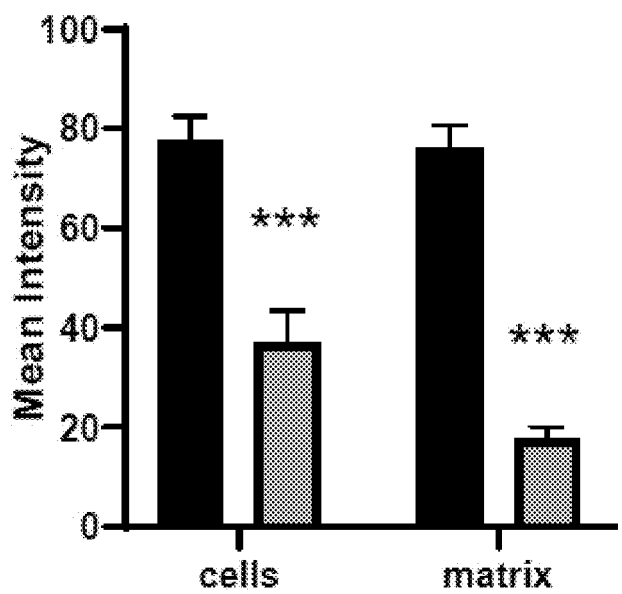
FIG. 3F demonstrates the quantitative analysis of confocal images acquired in a biofilm eradication assay.

To investigate Elasnin's effect on biofilm structure, confocal laser scanning microscopy (CLSM) observations with biofilm cell and matrix staining were used. In the biofilm inhibition assay, the untreated biofilms (FIG. 3A) showed distinct shapes with a high density of organized cells and matrix. Whereas, the biofilms treated with elasnin (FIG. 3B) exhibited a large decrease in the density of cells and matrix and both of the cells and matrices were randomly distributed. In the biofilm eradication assay, pre-formed biofilms were dispersed after treated with elasnin and biofilm cells were released into the media (FIG. 3D). Confocal images demonstrated that the distribution patterns of cells clearly changed after the treatment of elasnin. The untreated biofilm cells (FIG. 3C) distributed as a clump with a rough edge; while, elasnin treated biofilm cells distributed as narrow strips with a smooth edge (FIG. 3D). Similarly, the high density of the organized biofilm matrix became sparse and scattered after treatment with elasnin. According to the quantitative analysis, both cells and matrices were significantly reduced after the treatment of elasnin. Compared to the untreated biofilms, the biofilms treated with elasnin exhibited around 80% and 35% decrease in density of cells and matrices, respectively, in the biofilm inhibition assay (FIG. 3E). For biofilm eradication assay, the reduction in cells and matrices were over 50% and 70%, respectively (FIG. 3F).

Elasnin destroyed the biofilm matrix yet had no lethal effect on the cells. As noted by many researches (2,28), the biofilm matrix is crucial to the resistance of biofilm cells. The nonlethal effects of elasnin combined with its activity in biofilm matrix destruction further confirmed that elasnin is a biofilm-targeting agent, and the application of elasnin can has less risk to develop antimicrobial tolerance, since the emergence of antimicrobial tolerance is only associated with the use of bactericidal antibiotics (29). In addition, the anti-biofilm activities of elasnin against MRSA are also worth noting. The continuous emergence of multidrug-resistance in bacteria like MRSA, VRSA, and VRE put pressure on modern medicine. The effective eradicating efficiency of elasnin indicates its application in inducing the dispersal of biofilms, which has great potential in combination therapy with other antibiotics to treat biofilm-related diseases of MRSA.

EXAMPLE 4—ELASNIN SHOWED PREFERENCE TO THE BIOFILMS OF GRAM-POSITIVE BACTERIA

Figure 4A:
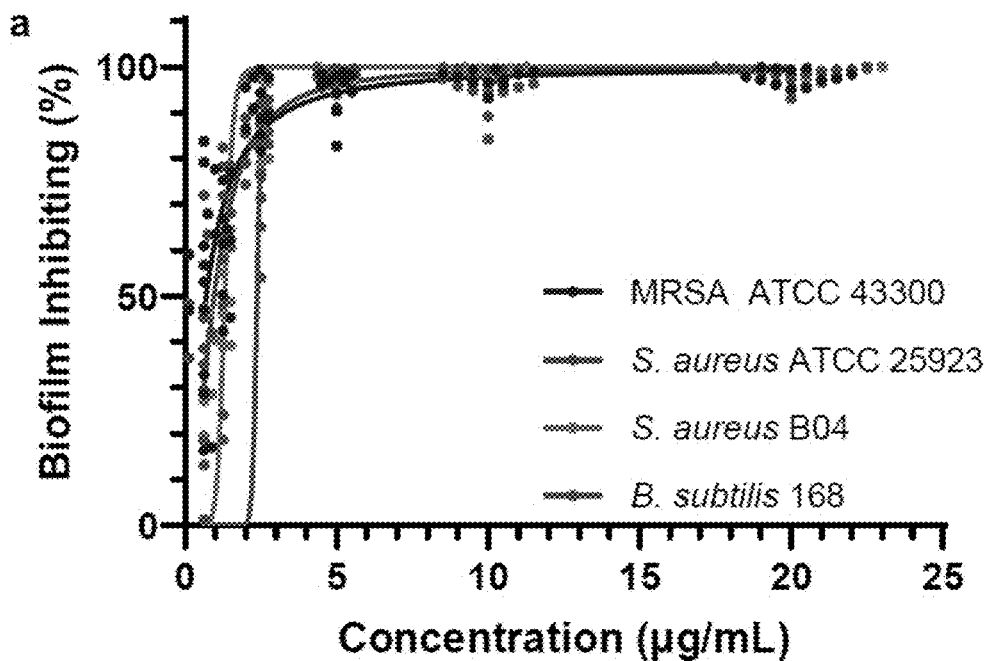
FIG. 4A demonstrates the anti-biofilm activities of elasnin to reduce of mono-species biofilm formation by 90%.
Figure 4B:
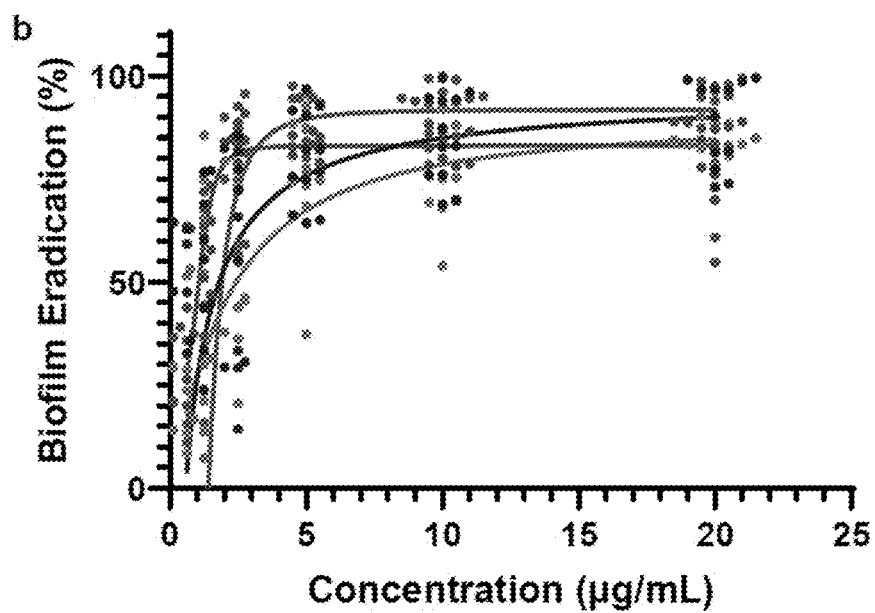
FIG. 4B demonstrates the anti-biofilm activity of elasnin to eradicate 50% of a mature mono-species biofilm.

A total of 6 strains (FIG. 4C) were selected to test elasnin's activities against biofilm, including S. aureus ATCC 25923, S. aureus B04, MRSA ATCC 43300, Bacillus subtilis 168, *E. coli* ATCC 25922 and *P. aeruginosa* PAO1. A similar pattern was observed among Gram-positive strains, in terms of MBICs and MBECs; whereas, Gram-negative strains showed completely different trends. The MBICs of elasnin for all Gram-positive bacteria were all in the range 1.25-2.5 µg/ml, except for *Bacillus subtilis* 168, which was 2.5-5 µg/ml (1.25 µg/ml inhibited at least 80% of the biofilms) (FIG. 4A). Variations in the MBECs were observed; *S. aureus* B04 was the most resistant strain to elasnin with a MBEC of 2.5-5 µg/ml; the most sensitive strain was *S. aureus* ATCC 25923 with lowest MBEC of 0.625-1.25 µg/ml; and for MRSA and *Bacillus subtilis*, the MBEC was 1.25-2.5 µg/ml (FIG. 4B). No activity was observed when treating Gram-negative bacteria *E. coli* and *P. aeruginosa* with elasnin. The development of biofilm formation was not influenced by elasnin even at a concentration of 100 µg/ml, and the viability of biofilm cells in both the MBIC and the MBEC assay were constant as the elasnin concentration increased. Overall, the results above suggested that elasnin may possess preference to Gram-positive bacteria.

EXAMPLE 5—ELASNIN-BASED COATINGS INHIBITED THE FORMATION OF MULTI-SPECIES BIOFILMS AND THE ATTACHMENT OF LARGE BIOFOULING ORGANISMS

Figure 8:
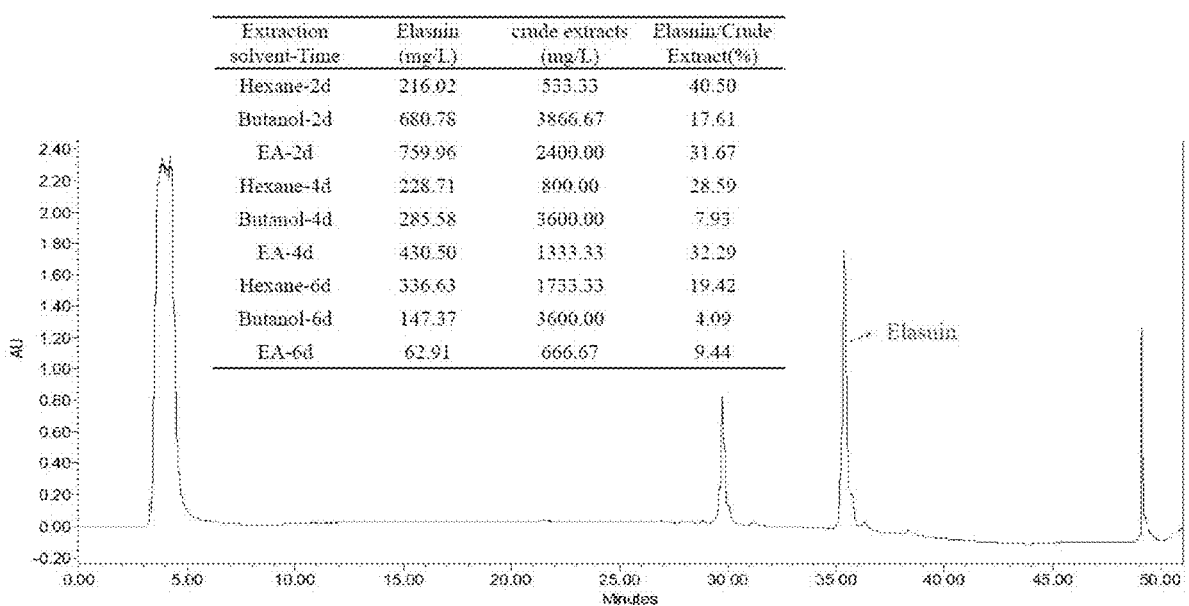
FIG. 8 provides the HPLC profile of high-elasnin-content crude extracts and productivity of crude extracts/elasnin using different extraction solvents.
Figure 9:
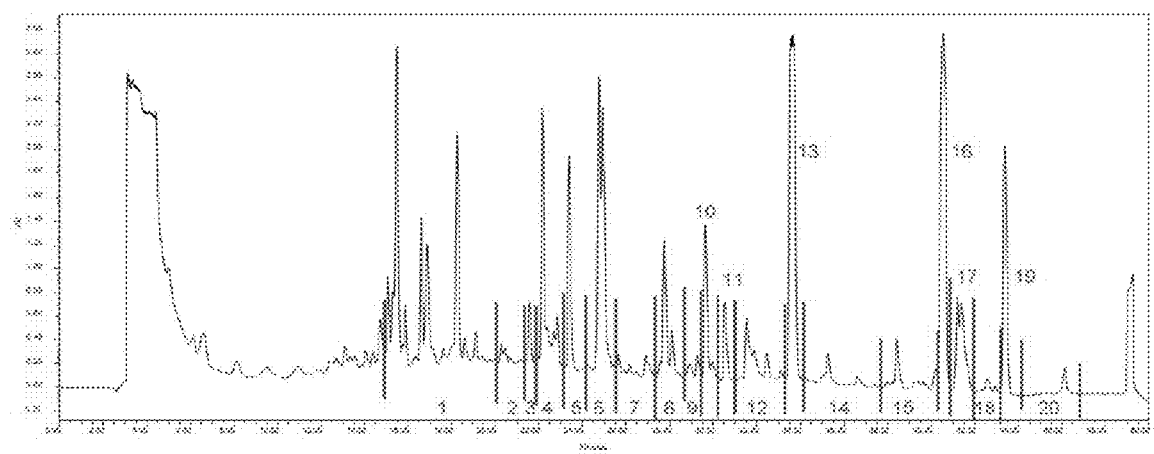
FIG. 9 shows the bioactivities of 20 fractions isolated from the crude extracts of the secondary metabolites produced by S. mobaraensis DSM 400847 (incubated in AM4 media and extracted with 1-butanol0. Fraction 17 were analogs of fraction 16 (elasnin).

Given the high anti-biofilm efficiency, elasnin-based anti-biofilm coatings were prepared and immersed in a fish farm to evaluate this efficiency against natural marine biofilm (FIG. 5D). Note that in the present study, a crude extract of *S. mobaraensis* DSM40847 that contained very high concentrations of elasnin (=336.64 mg/L in n-hexane, FIG. 8) was used instead of pure elasnin. The extracts were mixed with polyurethane (polymer) based on poly ε-caprolactone and applied directly on the surface of glass slides. The concentrations of the coatings were calculated based on the percentage of crude extracts in total coatings (polymer and crude extracts) by weight. As such, other compounds in the fractionated extract may have exerted an effect on the results of our field testing. However, their effect should be negligible, since there were not detected effects by the minor compounds in the crude extracts (FIG. 9).

Figure 5B:
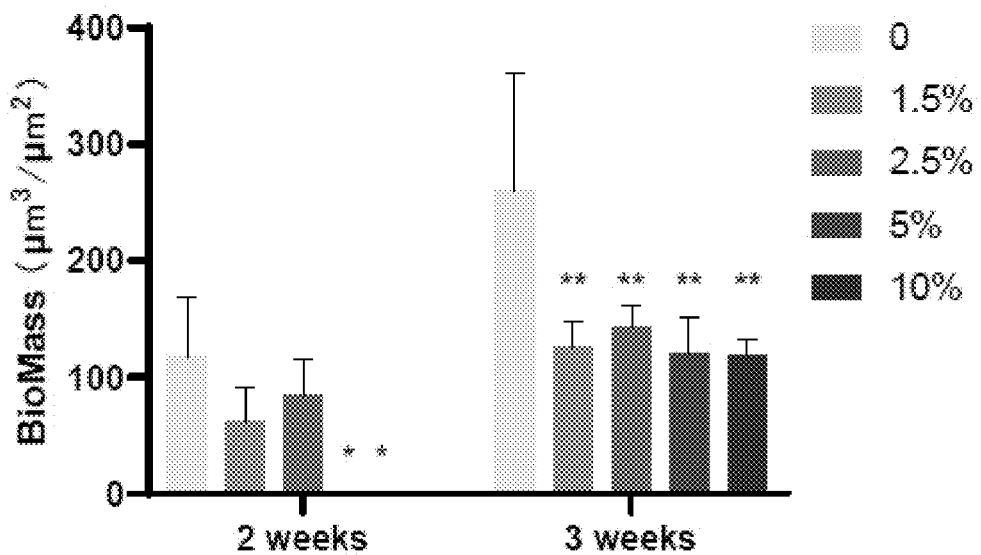
FIG. 5B shows the quantification of the biomass of biofilms observed by CLSM. Biomass was calculated using Comstat 2.1 based on the CLSM images and the values that are significantly different between elasnin-based anti-biofilm coatings and control groups are indicated by asterisks as follows: * for p<0.05 and ** for p<0.01.
Figure 5C:
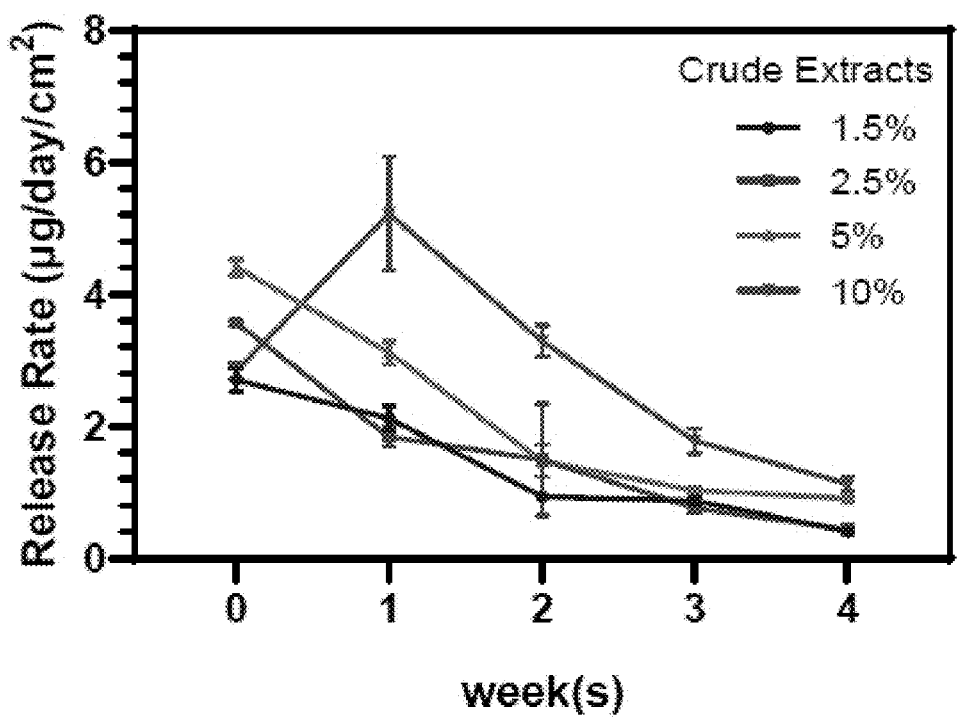
FIG. 5C shows the release rate of elasnin in artificial seawater.

The release rate of elasnin from the coatings was found to be dependent on both time and concentration for four weeks (FIG. 5C). In general, the release of elasnin from the coatings was at a reasonably low rate throughout the period; the higher the concentration, the faster elasnin was released into the artificial seawater. The highest release rate of approximately 5 µg day$^{-1}$ cm$^{-2}$ occurred in the second week for the concentration of 10 wt %; for other concentrations, the maximum release rate was around 4 µg day$^{-1}$ cm$^{-2}$ in the first week. The release rate decreased over time and depended on the total amount of elasnin remaining in the coatings. After immersion for four weeks, the release rate dropped to about 1 µg day$^{-1}$ cm$^{-2}$ for the concentrations of 10 wt % and 5 wt % and 0.5 µg day$^{-1}$ cm$^{-2}$ for 1.5 wt % and 2.5 wt %.

Figures 4C, 5A:
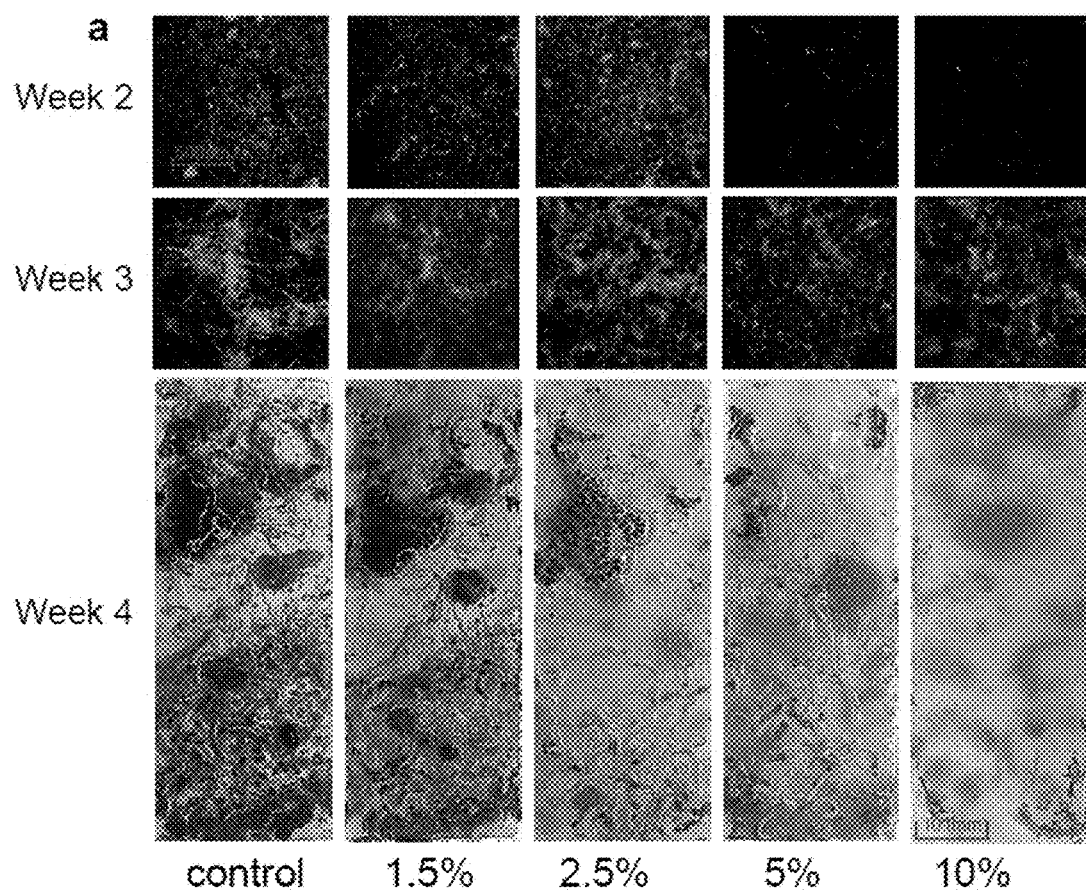
FIG. 4C shows the 6 bacterial strains used in anti-biofilm assays and the MBICs/MBECs of elasnin against these strains.
FIG. 5A provides figures that illustrate the anti-biofilm (week 2 & 3) and antifouling (week 4) performance of surfaces coated with PCL-Based Polyurethane mixed with varied concentrations of crude extracts (CR, secondary metabolites of DSM 40748 extracted with 1-Hexane).

The performance of the anti-biofilm coatings was assayed weekly from the second to the fourth week by direct and CLSM observation. According to the quantitative analysis of CLSM images, the average biofilm biomass on the slides without elasnin was 116.44 µm$^3$ µm$^{-2}$ in the second week and 259.95 µm3 µm$^{-2}$ in the third week; whereas, the average biomass of biofilms measured on the 5 wt % and 10 wt % coating slides was less than 0.1 µm$^3$ µm$^{-2}$ in the second week and less than 120 µm$^3$ µm$^{-2}$ in the third week. For coatings with low concentrations (1.5 wt % and 2.5 wt %), there were no significant differences in terms of average biomass (61.97 µm$^3$ µm$^{-2}$ and 84.73 µm$^3$ µm$^{-2}$ respectively) in the second week, but the biomass was significantly lower than that in the control (259.95 µm$^3$ m-2) in the third week, with average biomass of around 125 µm$^3$ µm$^{-2}$ and 145 µm$^3$ µm$^{-2}$, respectively (FIG. 5B). In the fourth week, slides coated with low concentrations of elasnin (1.5 wt %, 2.5 wt %, and control) were fouled by large marine organisms, while the slides coated with high concentrations of elasnin exhibited anti-macrofouling activity and almost no larval settlement, except for a small area near the edges due to edge effects commonly found on testing panels (FIG. 5A). Overall, elasnin-based anti-biofilm coatings inhibited the biofilm formation of multiple bacterial species in the first two weeks. However, after immersion for four weeks, the glass slides coated with low concentrations of elasnin were eventually covered by large biofouling organisms, likely due to the reduced release of elasnin after three weeks.

Apart from the biofilm-related infections, the formation of marine biofilms on various submerged surfaces like ship hull structures and offshore infrastructures is also a serious problem. Compared to the single population biofilm, mixed-population biofilms have a more complex architecture within the biofilm due to the addition of interspecies dynamics; therefore, the mixed-species biofilm is often significantly more resistant to antimicrobial treatment or disinfection (30). The elasnin-based coatings of the subject invention significantly inhibit biofilm formation. Remarkably, a negligible amount of elasnin can be released into the surrounding environment during treatment, limiting collateral effects on unintended organisms.

EXAMPLE 6—ELASNIN CHANGED THE MICROBIAL COMMUNITY OF NATURAL MARINE BIOFILMS

Figure 6A:
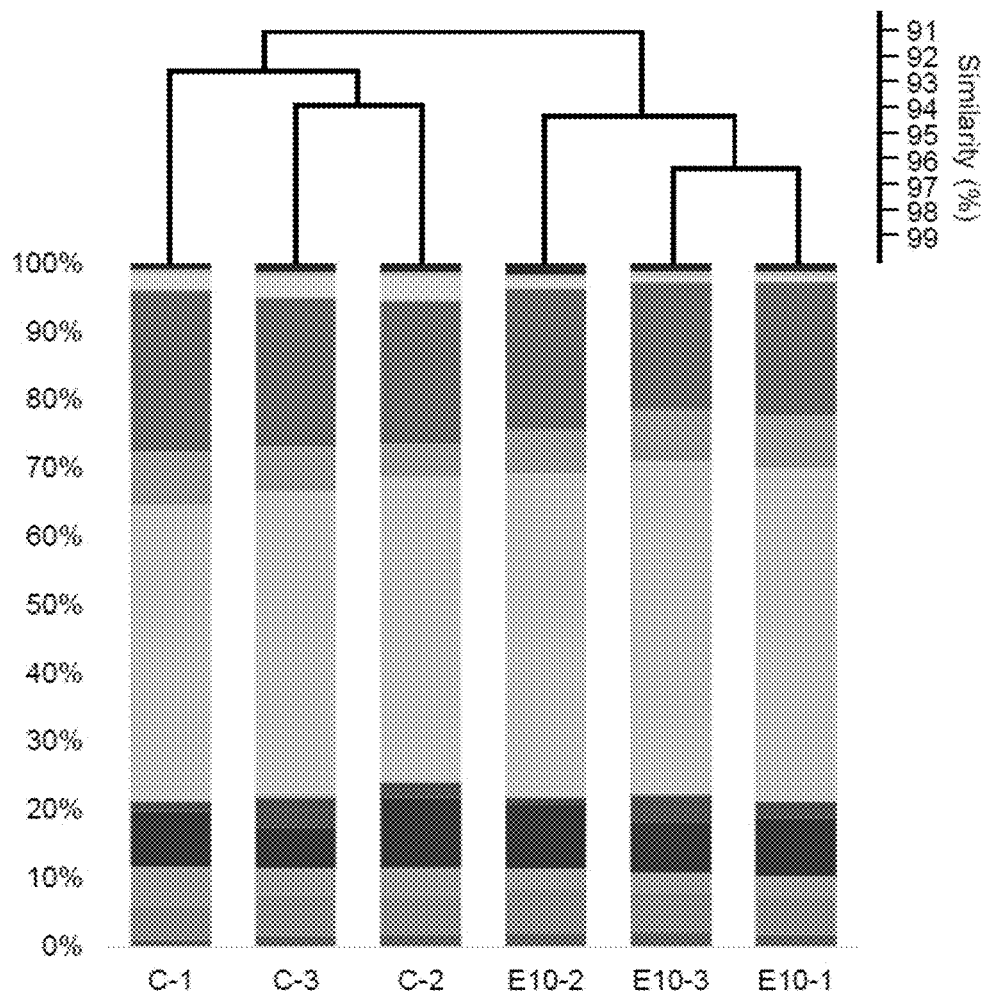
FIG. 6A provides comparison of microbial compositions between biofilms on control slides (C-1,2,3) and 10 wt % elasnin-based coatings (E10-1,2,3) based on the beta-diversity (Bray-Curtis) at the phylum level.
Figure 6B:
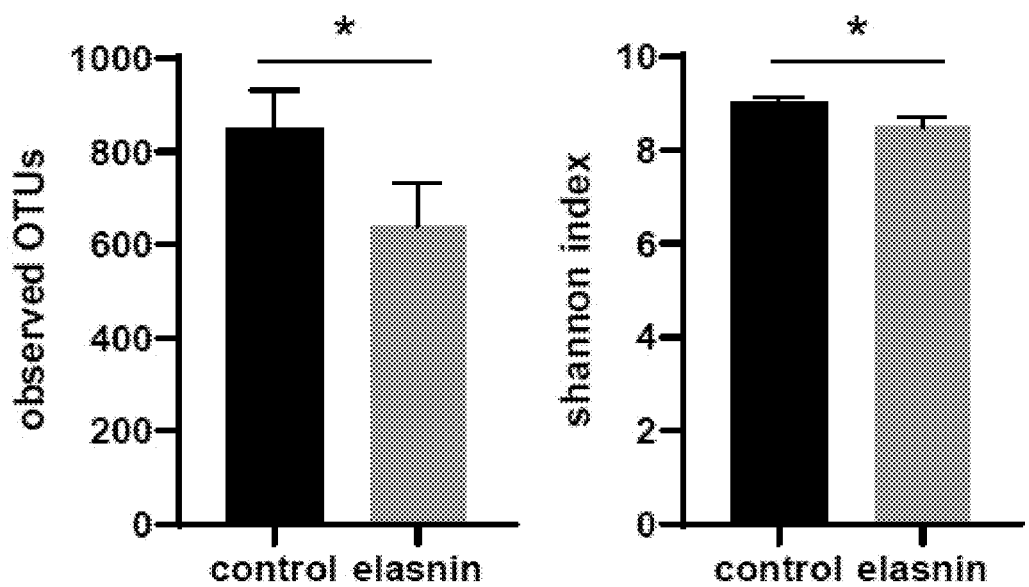
FIG. 6B shows the alpha-diversity of biofilms at the phylum level. The difference between the two types of biofilms was calculated by the student's t-test and is indicated by an asterisk as follows: * for p<0.05.
Figure 7A:
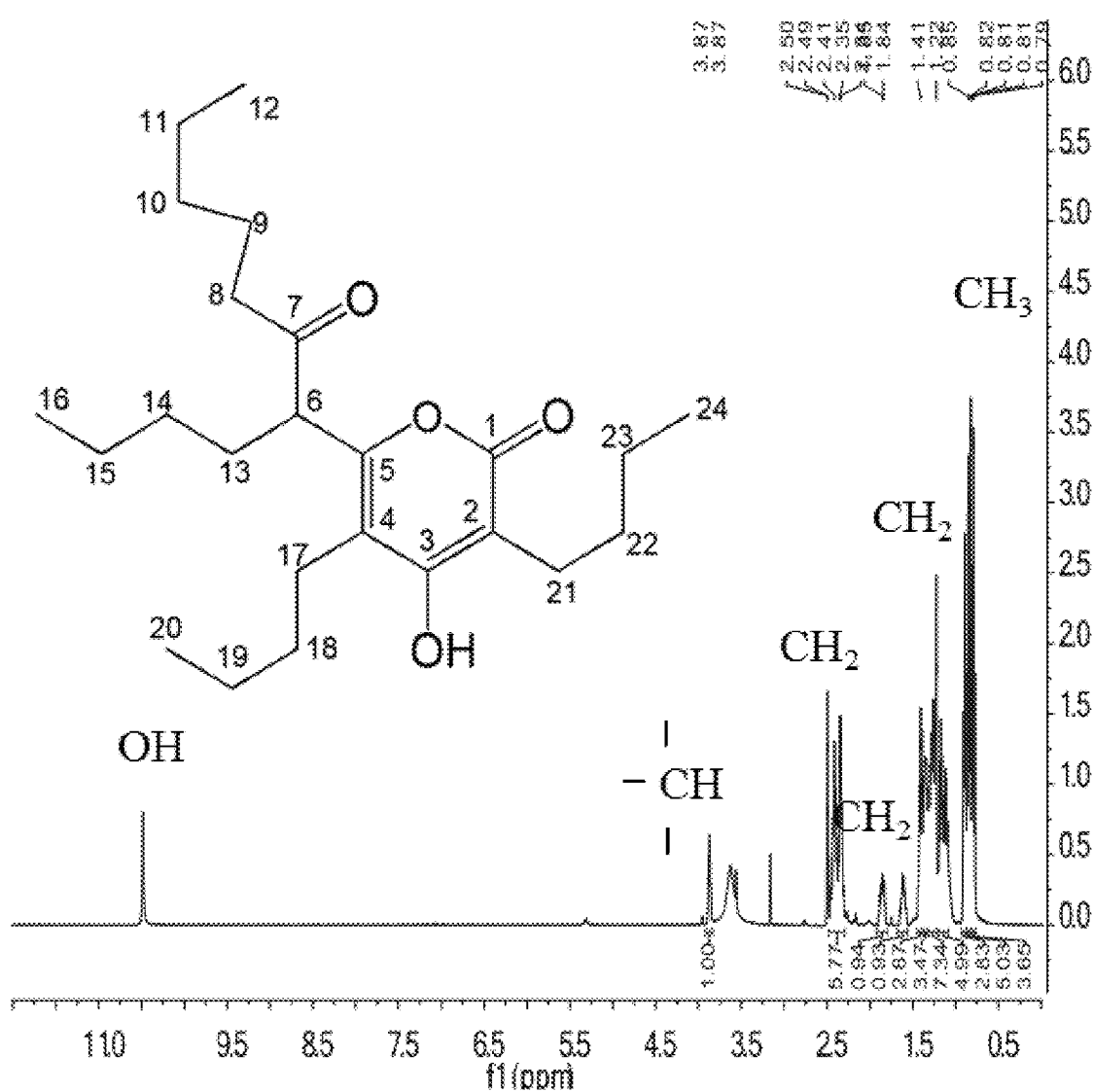
FIGS. 7A-7D Analysis of Elasnin fraction 16 showing (FIG. 7A) nuclear magnetic resonance ($^1$H-NMR)
Figure 7B:
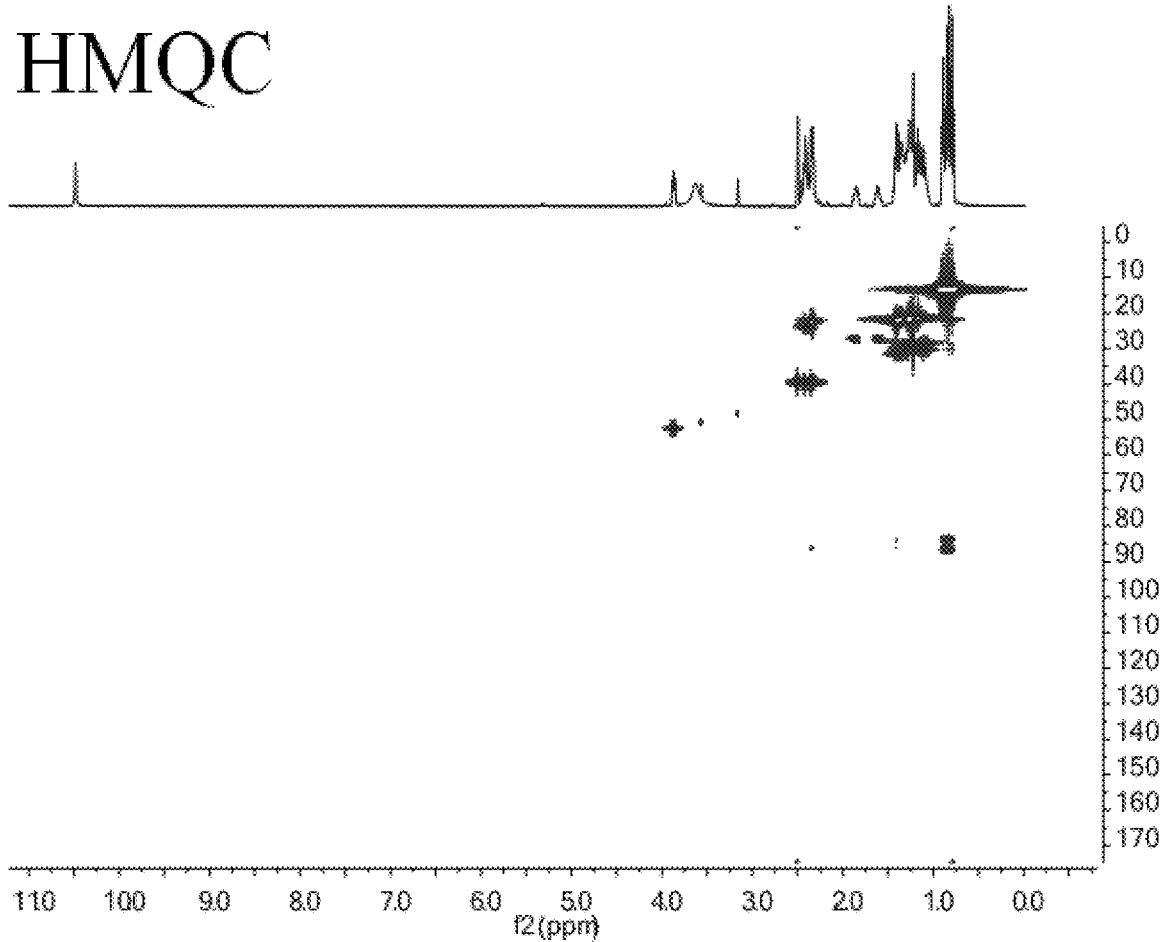
Figure 7C:
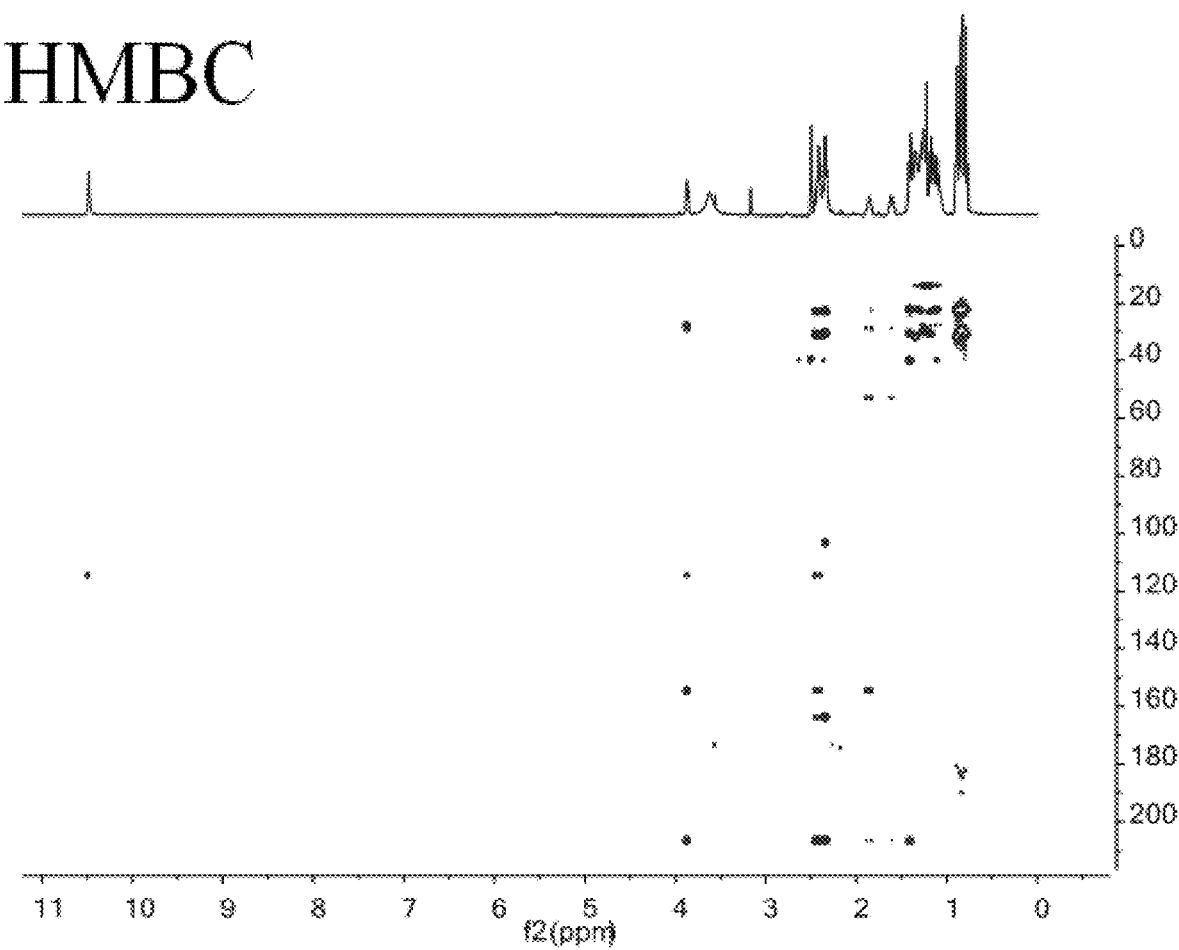
Figure 7D:
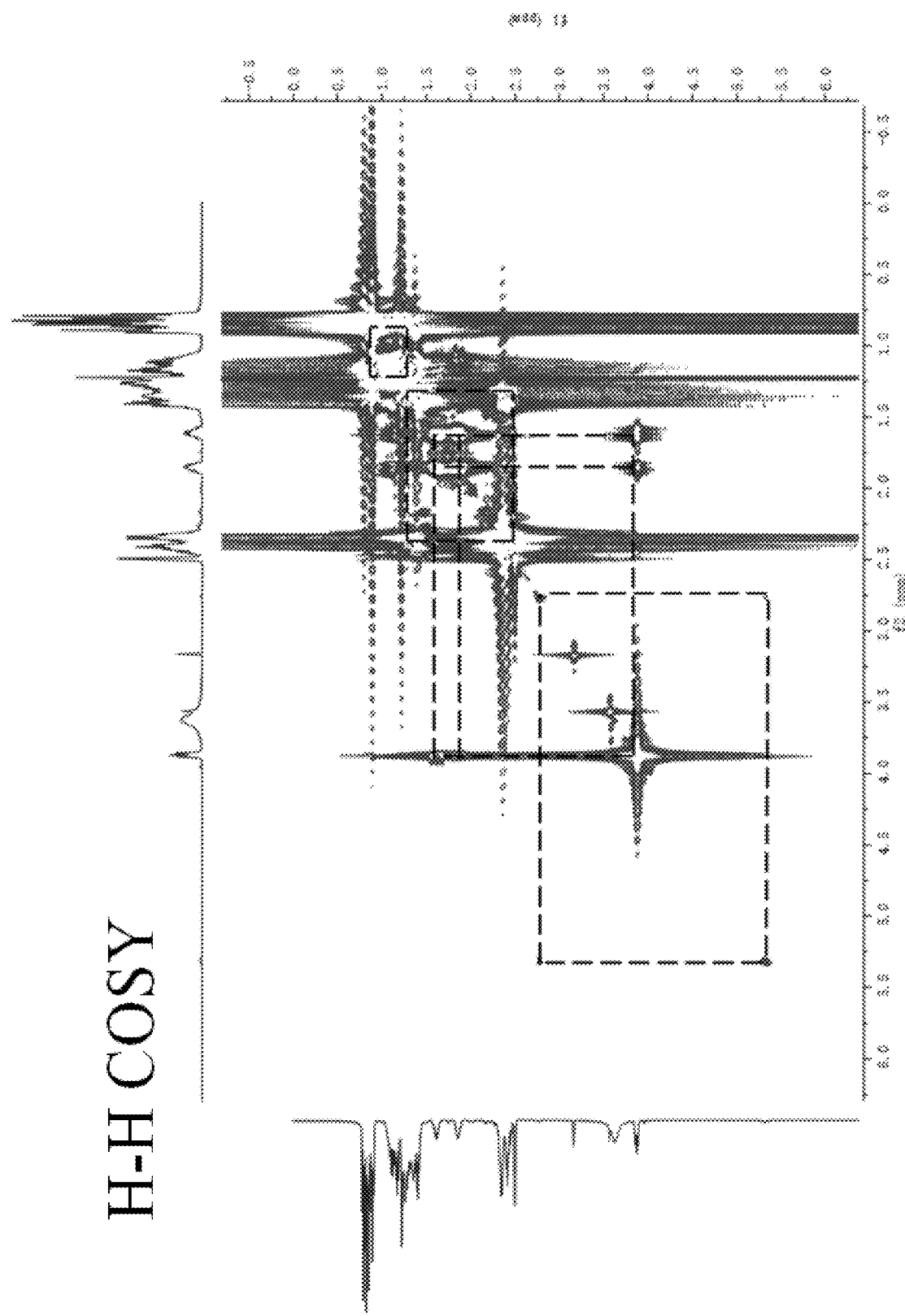
Figure 10:
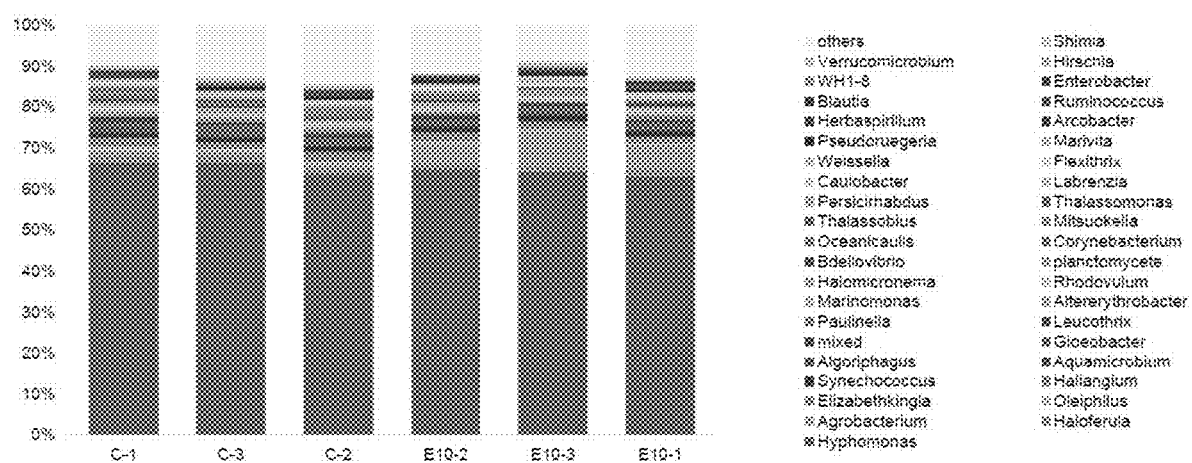
FIG. 10 shows the microbial compositions of biofilms on control slides (C1, C2, and C3) and on slides with 10 wt % elasnin-based coatings (E10-1, E10-2, and E10-3) at the genus level.

Since few biofilms developed by the end of the second week but macroscopic fouling organisms had overgrown by the end of the fourth week, only the three-week-old biofilms developed on 10 wt % coatings and those on the control glass slides (coated with poly ε-caprolactone based polyurethane only) were selected for 16S amplicon analysis to determine the changes in biofilm microbial community triggered by elasnin. A total of 3,000,000 16S rRNA gene sequences (500,000 per sample) were classified into 31 phyla (Proteobacteria were classified to the class level). The microbial composition of the biofilms differed between the 10 wt % coatings and the control slides (FIG. 10), as confirmed by alpha- and beta-diversity analysis. In the Bray-Curtis dissimilarity (beta-diversity) dendrogram (FIG. 6A), the control group and treatment group were clustered separately, based on the differences in microbial abundance between samples; the observed OTUs and Shannon diversity for the treated biofilm were significantly lower than those in the control group (FIG. 6B), suggesting that both the species richness and diversity in the treated biofilms were reduced.

It should be understood that the examples and embodiments described herein are for illustrative purposes only and that various modifications or changes in light thereof will be suggested to persons skilled in the art and are to be included within the spirit and purview of this application and the scope of the appended claims. In addition, any elements or limitations of any invention or embodiment thereof disclosed herein can be combined with any and/or all other elements or limitations (individually or in any combination)

or any other invention or embodiment thereof disclosed herein, and all such combinations are contemplated with the scope of the invention without limitation thereto.

REFERENCES

1. O'Toole, G., Kaplan, H. B., & Kolter, R. (2000). Biofilm formation as microbial development. Annual Reviews in Microbiology, 54(1), 49-79.
2. Flemming, H. C., & Wingender, J. (2010). The biofilm matrix. Nature reviews microbiology, 8(9), 623.
3. Davey, M. E., & O'toole, G. A. (2000). Microbial biofilms: from ecology to molecular genetics. Microbiol. Mol. Biol. Rev., 64(4), 847-867.
4. Hall-Stoodley, L., Costerton, J. W., & Stoodley, P. (2004). Bacterial biofilms: from the natural environment to infectious diseases. Nature reviews microbiology, 2(2), 95.
5. Rodríguez-Martínez, J. M., & Pascual, A. (2006). Antimicrobial resistance in bacterial biofilms. Reviews in Medical Microbiology, 17(3), 65-75.
6. Antunes, L. C. M., & Ferreira, R. B. (2011). Biofilms and bacterial virulence. Reviews in Medical Microbiology, 22(1), 12-16.
7. Donlan, R. M. (2001). Biofilm formation: a clinically relevant microbiological process. Clinical Infectious Diseases, 33(8), 1387-1392.
8. Donlan, R. M. (2002). Biofilms: microbial life on surfaces. Emerging infectious diseases, 8(9), 881.
9. Dang, H., & Lovell, C. R. (2016). Microbial surface colonization and biofilm development in marine environments. Microbiol. Mol. Biol. Rev., 80(1), 91-138.
10. López, D., Vlamakis, H., & Kolter, R. (2010). Biofilms. Cold Spring Harbor perspectives in biology, 2(7), a000398.
11. Hengzhuang, W., Wu, H., Ciofu, O., Song, Z., & Høiby, N. (2011). Pharmacokinetics/pharmacodynamics of colistin and imipenem on mucoid and nonmucoid Pseudomonas aeruginosa biofilms. Antimicrobial agents and chemotherapy, 55(9), 4469-4474.
12. Davies, D. (2003). Understanding biofilm resistance to antibacterial agents. Nature reviews Drug discovery, 2(2), 114.
13. Mah, T. F. C., & O'Toole, G. A. (2001). Mechanisms of biofilm resistance to antimicrobial agents. Trends in microbiology, 9(1), 34-39.
14. Hall, C. W., & Mah, T. F. (2017). Molecular mechanisms of biofilm-based antibiotic resistance and tolerance in pathogenic bacteria. FEMS microbiology reviews, 41(3), 276-301.
15. Del Pozo, J. L., & Patel, R. (2007). The challenge of treating biofilm-associated bacterial infections. Clinical Pharmacology & Therapeutics, 82(2), 204-209.
16. de Carvalho, C. C. (2018). Marine biofilms: a successful microbial strategy with economic implications. Frontiers in Marine Science, 5, 126.
17. Lehaitre, M., Delauney, L., & Compère, C. (2008). Biofouling and underwater measurements. Real-time observation systems for ecosystem dynamics and harmful algal blooms: Theory, instrumentation and modelling. Oceanographic Methodology Series. UNESCO, Paris, 463-493.
18. Koo, H., Allan, R. N., Howlin, R. P., Stoodley, P., & Hall-Stoodley, L. (2017). Targeting microbial biofilms: current and prospective therapeutic strategies. Nature Reviews Microbiology, 15(12), 740.
19. Ribeiro, S. M., Felicio, M. R., Boas, E. V., Goncalves, S., Costa, F. F., Samy, R. P., . . . & Franco, O. L. (2016). New frontiers for anti-biofilm drug development. Pharmacology & therapeutics, 160, 133-144.
20. Li, J. W. H., & Vederas, J. C. (2009). Drug discovery and natural products: end of an era or an endless frontier?. Science, 325(5937), 161-165.
21. Fischbach, M. A., & Walsh, C. T. (2009). Antibiotics for emerging pathogens. Science, 325(5944), 1089-1093
22. Nosengo, N. (2016). Can you teach old drugs new tricks?. Nature News, 534(7607), 314.
23. Genilloud, O. (2017). Actinomycetes: still a source of novel antibiotics. Natural product reports, 34(10), 1203-1232.
24. Kaleem, F., Usman, J., Hassan, A., Omair, M., Khalid, A., & Uddin, R. (2010). Sensitivity pattern of methicillin resistant Staphylococcus aureus isolated from patients admitted in a tertiary care hospital of Pakistan. Iranian journal of microbiology, 2(3), 143.
25. Garau, J., Bouza, E., Chastre, J., Gudiol, F., & Harbarth, S. (2009). Management of methicillin-resistant Staphylococcus aureus infections. Clinical microbiology and infection, 15(2), 125-136.
26. LaPlante, K. L., & Mermel, L. A. (2009). In vitro activities of telavancin and vancomycin against biofilm-producing Staphylococcus aureus, S. epidermidis, and Enterococcus faecalis strains. Antimicrobial agents and chemotherapy, 53(7), 3166-3169.
27. Rodrigues, A., Gomes, A., Marcal, P. H. F., & Dias-Souza, M. V. (2017). Dexamethasone abrogates the antimicrobial and antibiofilm activities of different drugs against clinical isolates of Staphylococcus aureus and Pseudomonas aeruginosa. Journal of advanced research, 8(1), 55-61.
28. Flemming, H. C., Wingender, J., Szewzyk, U., Steinberg, P., Rice, S. A., & Kjelleberg, S. (2016). Biofilms: an emergent form of bacterial life. Nature Reviews Microbiology, 14(9), 563.
29. Lebeaux, D., Ghigo, J. M., & Beloin, C. (2014). Biofilm-related infections: bridging the gap between clinical management and fundamental aspects of recalcitrance toward antibiotics. Microbiol. Mol. Biol. Rev., 78(3), 510-543.
30. Yin, Q., Liang, J., Zhang, W., Zhang, L., Hu, Z. L., Zhang, Y., & Xu, Y. (2019). Butenolide, a Marine-Derived Broad-Spectrum Antibiofilm Agent Against Both Gram-Positive and Gram-Negative Pathogenic Bacteria. Marine biotechnology, 21(1), 88-98.
31. Nair, S., Desai, S., Poonacha, N., Vipra, A., & Sharma, U. (2016). Antibiofilm activity and synergistic inhibition of Staphylococcus aureus biofilms by bactericidal protein P128 in combination with antibiotics. Antimicrobial agents and chemotherapy, 60(12), 7280-7289.
32. Bolyen, E., Rideout, J. R., Dillon, M. R., Bokulich, N. A., Abnet, C. C., Al-Ghalith, G. A., . . . & Bai, Y. (2019). Reproducible, interactive, scalable and extensible microbiome data science using QIIME 2. Nature biotechnology, 1.
33. Patel, R. K., & Jain, M. (2012). NGS QC Toolkit: a toolkit for quality control of next generation sequencing data. PloS one, 7(2), e30619.

We claim:

1. An anti-biofilm composition comprising elasnin and one or more antimicrobial compounds, wherein the composition exhibits anti-biofilm activity and comprises elasnin at a concentration of 1.25 to 2.5 µg/ml and the one or more antimicrobial compounds at a concentration of 1.25 to 2.5 µg/ml, wherein the composition is selected from the group consisting of acrylic-based, latex-based, and oil-based anti-biofilm compositions.

2. The anti-biofilm composition of claim 1, wherein the antimicrobial compound is vancomycin.

3. The anti-biofilm composition of claim 1, wherein the composition does not leach into a surrounding environment.

4. The anti-biofilm composition of claim 3, wherein the surrounding environment is selected from the group consisting of marine and freshwater.

5. The anti-biofilm composition of claim 1, wherein the anti-biofilm composition comprises an adhesion-promoting substance.

6. The anti-biofilm composition of claim 1, further comprising a traditional coating ingredient that is a binder, pigment, sealant, solvent, pH modifier, or buffering agent.

7. The anti-biofilm composition of claim 1, wherein the composition comprises natural origin or synthetically derived latex.

8. The anti-biofilm composition of claim 1, wherein the composition comprises one or more acrylic resins.

9. The anti-biofilm composition of claim 1, wherein the composition comprises a synthetic or natural resin.

10. An anti-biofilm composition comprising elasnin and one or more antimicrobial compounds, wherein the composition exhibits anti-biofilm activity and comprises elasnin at a concentration of 1.25 to 2.5 µg/ml and the one or more antimicrobial compounds at a concentration of 1.25 to 2.5 µg/ml, wherein the composition further comprises a binder.

11. The anti-biofilm composition of claim 10, wherein the binder is selected from acrylic, alkyds, acrylic acid, acrylamide, phenolic, phenolic-alkyd, polyacrylamide, polyurethanes, silicone-alkyds, polyesters, epoxies, vinyl, vinyl acetate-ethylene, vinyl-alkyd, inorganic binders, organic binders, aliphatic-urethanes, and oil-modified urethanes.

12. An anti-biofilm composition comprising elasnin and one or more antimicrobial compounds, wherein the composition exhibits anti-biofilm activity and comprises elasnin at a concentration of 1.25 to 2.5 µg/ml and the one or more antimicrobial compounds at a concentration of 1.25 to 2.5 µg/ml, wherein the composition further comprises a pigment or dye.

13. The anti-biofilm composition of claim 12, wherein the pigment or dye is selected from titanium dioxide, zinc oxide, zinc yellow, yellow dyes, benzidine yellows, chrome oxide green, phthalocyanine green, phthalocyanine blue, ultramarine blue, vermillion, pigment brown 6, red 170, dioxazine violet, carbon black, iron (II) oxide, quartz sand ($SiO_2$), talc, barite ($BaSO_4$), kaolin clay, and limestone ($CaCO_3$).

* * * * *